(12) United States Patent
Mizuno et al.

(10) Patent No.: US 8,162,538 B2
(45) Date of Patent: Apr. 24, 2012

(54) TEMPERATURE-MEASURING MEMBER, TEMPERATURE-MEASURING DEVICE, AND METHOD FOR MEASURING TEMPERATURE

(75) Inventors: Masao Mizuno, Kobe (JP); Takayuki Hirano, Kobe (JP); Katsufumi Tomihisa, Kobe (JP)

(73) Assignee: Kabushiki Kaisha Kobe Seiko Sho, Hyogo (JP)

( * ) Notice: Subject to any disclaimer, the term of this patent is extended or adjusted under 35 U.S.C. 154(b) by 966 days.

(21) Appl. No.: 12/216,207

(22) Filed: Jul. 1, 2008

(65) Prior Publication Data

US 2009/0016407 A1    Jan. 15, 2009

(30) Foreign Application Priority Data

Jul. 9, 2007  (JP) ................................ 2007-180249
Jul. 9, 2007  (JP) ................................ 2007-180250

(51) Int. Cl.
  *G01K 11/00*  (2006.01)
  *G01K 3/00*   (2006.01)
  *G01K 1/00*   (2006.01)
(52) U.S. Cl. ...................................... 374/160; 374/137
(58) Field of Classification Search ............... 374/160, 374/161, 137
  See application file for complete search history.

(56) References Cited

U.S. PATENT DOCUMENTS

| | | | |
|---|---|---|---|
| 6,314,228 B1 * | 11/2001 | Korenaga et al. | 374/E11.015 |
| 6,606,442 B2 * | 8/2003 | Korenaga et al. | 374/E11.015 |
| 7,182,510 B2 * | 2/2007 | Cahill | 374/44 |
| 7,357,035 B2 * | 4/2008 | Liu et al. | 374/E7.023 |
| 7,901,133 B2 * | 3/2011 | Otsuka | 374/121 |
| 2002/0018634 A1 * | 2/2002 | Korenaga et al. | 385/132 |
| 2005/0021247 A1 * | 1/2005 | Liu et al. | 702/42 |
| 2006/0222043 A1 * | 10/2006 | Cahill | 374/44 |
| 2007/0234793 A1 * | 10/2007 | Liu et al. | 73/198 |
| 2008/0022778 A1 * | 1/2008 | Liu et al. | 73/726 |
| 2008/0089383 A1 * | 4/2008 | Liu et al. | 374/44 |
| 2009/0016407 A1 * | 1/2009 | Mizuno et al. | 374/161 |

FOREIGN PATENT DOCUMENTS

| | | |
|---|---|---|
| CN | 1432799 A | 1/2002 |
| JP | 09-005166 | 6/1995 |
| JP | 09-113379 | 10/1995 |
| KR | 10-0686332 | 2/2007 |

OTHER PUBLICATIONS

Office Action from Korean Patent Office for Application 10-2008-65919 dated Aug. 30, 2010.

\* cited by examiner

*Primary Examiner* — Yaritza Guadalupe-McCall
(74) *Attorney, Agent, or Firm* — Stites & Harbison, PLLC; Juan Carlos A. Marquez, Esq.

(57) ABSTRACT

The surface density of projections formed on a thin metal film of a temperature-measuring member having the metal film having been subjected to a temperature profile is calculated with a number-calculating section according to image data fed into an arithmetic processing unit through an optical microscope, CCD camera, and I/O board. The maximum temperature of the object is determined with the temperature-calculating unit according to the surface density and data on the maximum temperature and surface density previously stored in memory. Furthermore, a temperature-measuring member constituted by a thin aluminum film arranged on a substrate is used. A reduction in the reflectivity of the film due to projections formed on the film surface according to a temperature profile to which the member has been subjected is measured. The maximum temperature in the temperature profile is estimated according to the reduction in reflectivity.

16 Claims, 9 Drawing Sheets

HEAT TREATMENT TEMPERATURE: 280°C
SURFACE DENSITY: 52×10E9/m$^2$
OBJECTIVE LENS ×40

16791 PROJECTIONS/233°C

50369 PROJECTIONS/374°C

5149 PROJECTIONS/182°C

40131 PROJECTIONS/336°C

1671 PROJECTIONS/161°C

26830 PROJECTIONS/274°C

MAXIMUM TEMPERATURE 200°C

MAXIMUM TEMPERATURE 300°C

MAXIMUM TEMPERATURE 150°C

MAXIMUM TEMPERATURE 300°C

WITHOUT HEAT TREATMENT
(AS DEPOSITED)

MAXIMUM TEMPERATURE 250°C

FIG. 7A TO 7E: DIFFERENTIAL INTERFERENCE MICROSCOPE,
FIG. 7F: SEM

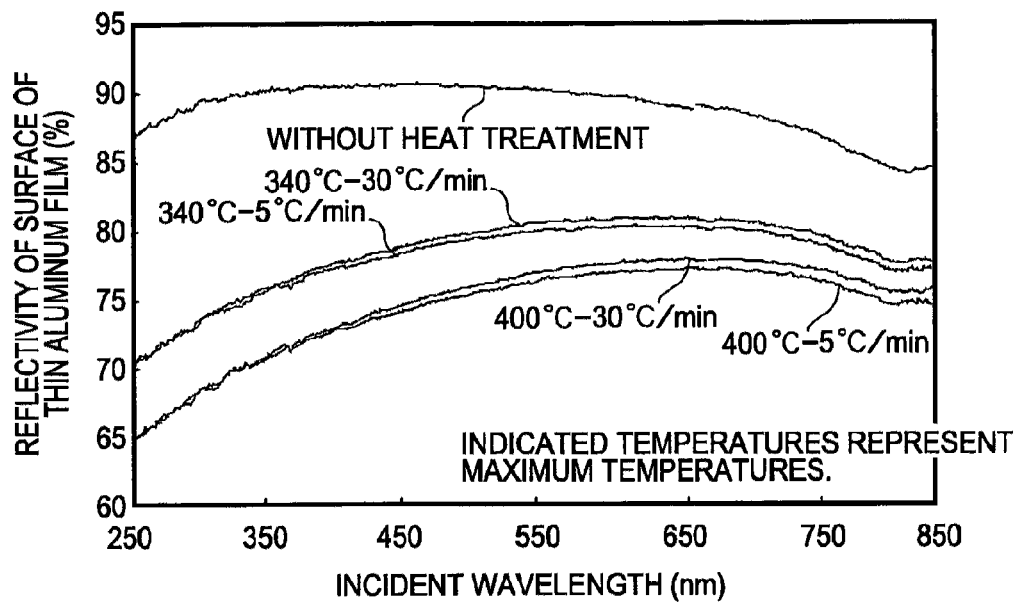
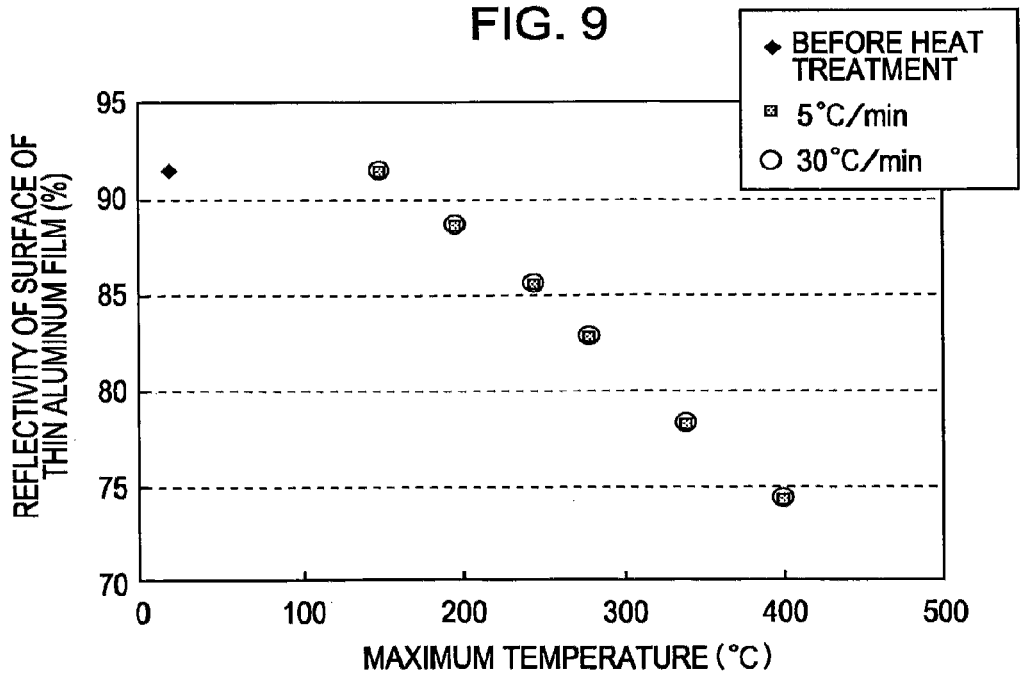

TEMPERATURE-MEASURING MEMBER, TEMPERATURE-MEASURING DEVICE, AND METHOD FOR MEASURING TEMPERATURE

BACKGROUND OF THE INVENTION

1. Field of the Invention

The present invention relates to a technique for measuring the temperature of an object such as a substrate used in the fields of the manufacture of semiconductors and liquid-crystal devices. Specifically, the present invention relates to a temperature-measuring member configured to measure the maximum temperature of the object in a temperature profile, a temperature-measuring device, and a method for measuring a temperature.

2. Description of the Related Art

Typical examples of a temperature-measuring member configured to measure the temperature of a target object include a member utilizing a change in the thermal expansion coefficient of a gas or liquid; a member measuring a change in the electrical resistance of a metal with temperature (platinum resistance thermometer); a member measuring a change in semiconducting property with temperature (thermistor); a member measuring a thermoelectromotive force generated at the contact point of different alloys (thermocouple); a member measuring the intensity of infrared radiation from a target object (infrared thermometer); and a member measuring the magnetized state of a target object after a magnetic field is applied to the target object (for example, see Japanese Unexamined Patent Application Publication Nos. 9-5166 and 9-113379). Furthermore, label-type temperature-measuring members utilizing melting points of substances are commercially available.

Temperature measurement is performed in various circumstances. Temperature-measuring members are appropriately selected in accordance with target objects. In particular, thermocouples are used as precise temperature-measuring members in many fields.

Also in the fields of the manufacture of semiconductors and liquid-crystal devices, temperature measurement is performed everywhere. In the field of the manufacture of liquid-crystal devices, substrates are mainly composed of glass. Thus, heat treatment is often performed at a temperature equal to or lower than the allowable temperature limit of glass, i.e., about 150° C. to about 400° C. In the field of the manufacture of semiconductors, heat treatment is often performed in the range of about 150° C. to about 600° C., which is slightly higher than the temperature range above.

On production lines in the fields of the manufacture, in general, substrates are conveyed while being subjected to temperature profiles in heat-treatment furnaces and heated deposition systems. Thus, it is difficult to directly measure the temperature of substrates with, for example, thermocouples. The temperature of substrates is usually estimated by measuring the temperature of atmospheres in furnaces and systems.

If the temperature of substrates can be directly measured with precision, the accuracy of process control is improved. This contributes to achieving higher performance of products. Such situations are commonly recognized in many fields of manufacture as well as the fields of the manufacture of semiconductors and liquid-crystal devices.

For example, when a target object is transported (in other words, continuously moved), a temperature-measuring member that needs to be connected to leads, e.g., a thermocouple, cannot be used. In such a case, an example of temperature-measuring members capable of measuring the temperature of the target object is a noncontact thermometer such as a radiation thermometer.

In the case where the noncontact thermometer is used, however, to measure the temperature of the target object subjected to a temperature profile, it is necessary to move the noncontact thermometer with the transportation of the target object or to install many noncontact thermometers along the transport direction of the target object, thereby disadvantageously complicating facilities and increasing equipment cost. Furthermore, when the target object is totally enclosed, an observation cannot be made on the target object. Thus, the noncontact thermometer cannot be used.

Another example of a temperature-measuring member that does not need to be connected to leads is a label-type temperature-measuring member. Such a label-type temperature-measuring member includes a plurality of pigments that change color and that are provided between resin sheets in 10° C. or 25° C. steps. The label-type temperature-measuring member has the advantage of simplicity and excellent accuracy. However, the label-type temperature-measuring member contains the resin component; hence, it is difficult to measure a temperature of 250° C. or higher. Furthermore, the label-type temperature-measuring member utilizes the melting phenomenon of the materials, thereby possibly generating impurities due to the evaporation of the molten materials. Thus, when the substrate must not be contaminated with the impurities, the label-type temperature-measuring member cannot be used.

In recent years, a wafer sensor in which temperature sensors, an IC recorder, and a battery are incorporated in the wafer has been developed. A temperature profile to which a target substrate is subjected can be measured with the wafer sensor. However, since the battery and semiconductor elements are used, the temperature range that can be measured with the wafer is at most about 150° C. It is thus difficult to measure a temperature higher than about 150° C.

Examples of a temperature-measuring member that can measure the maximum temperature without electrical wiring include a member utilizing a change in the volume of a ceramic material during sintering; and a member utilizing the softening of a ceramic material (Seger cone). However, these temperature-measuring members composed of ceramic materials are used in a high temperature range, i.e., 800° C. to 1,000° C. or higher. Thus, these temperature-measuring members are not suitable for temperature measurement in the range of about 150° C. to about 600° C., the temperature range being required for the fields of the manufacture of semiconductors and liquid-crystal devices.

SUMMARY OF THE INVENTION

In the case where the above-described temperature-measuring members having been used, temperature-measuring devices, and temperature measurement methods using the temperature-measuring members are employed, disadvantageously, there is no member capable of measuring a temperature in a wide temperature range of low to high temperatures without external wiring or generation of impurities or dust.

To overcome the foregoing problems, it is an object of the present invention to provide a temperature-measuring member that eliminates the need for external wiring, prevents the contamination of a substrate with impurities, dust, and atmosphere, and can measure the maximum temperature in a wide temperature range from low to high temperatures. It is another object of the present invention to provide a temperature-measuring device and a method for measuring a temperature.

The inventors have conducted intensive studies to overcome the foregoing problems and have completed the present invention.

In general, when a substrate, such as a silicon substrate or glass substrate, having a thin metal film formed by evaporation, sputtering, or plating is heated, a stress is applied to the substrate because of the difference in thermal expansion coefficient between the substrate and the thin metal film. In the beginning of heating, the thin metal film is elastically deformed according to the stress due to the difference in thermal expansion coefficient between the substrate and the thin metal film. At a higher temperature, the stress applied to the thin metal film increases. When the stress reaches a limiting value, the thin metal film begins to deform plastically. At this point, when the direction of a force acting on the surface of the thin metal film is a compressive direction, projections are formed on the surface. In contrast, when a strong force acts on the surface in the tensile direction, holes as depressions are formed.

Whether the stress applied to the thin metal film during heating is a compressive stress or tensile stress depends primarily on a combination of the substrate and the thin metal film. For example, when a thin aluminum film is formed on a silicon substrate, a compressive stress is applied to the thin aluminum film because aluminum has a thermal expansion coefficient larger than that of silicon, thereby forming projections on the surface of the thin aluminum film.

Once projections are formed on the surface, the stress applied to the thin film is relieved. Thus, the number of projections does not increase even when the film is maintained at a constant temperature. A further increase in temperature produces a compressive stress due to the difference in thermal expansion coefficient described above, thus forming projections. When the substrate is cooled after the completion of heating, a stress in the direction opposite the direction during heating is usually applied to the thin film. However, the formed projections do not disappear. Thus, the projections remain even when the substrate is cooled to room temperature (see FIGS. 7A to 7F).

To make the thin metal film arranged on the substrate usable as a practical temperature-measuring member, preferably, the number of projections formed on the surface of the thin film depends only on the maximum temperature and does not depend on the heating rate or holding time at a constant temperature.

However, it is still unclear whether the number of projections formed depends only on the maximum temperature and whether the number of projections formed depends on the heating rate and the temperature-holding time. Usually, the formation of projections may be significantly affected by the deposition conditions and the type of substrate. The number of projections may vary according to experimental conditions. In general, a thin metal film has defects due to holes and impurities. The defects may diffuse by heat treatment. The diffusion proceeds by holding the film for a prolonged period of time at a constant temperature. In the case where such diffusion has a major impact on the formation of projections by heat treatment, the number of projections formed can be changed only by maintaining the film at a constant temperature. In such a case, it is difficult to apply the phenomenon of the formation of projections to temperature measurement. Furthermore, if the diffusion rate of the defects is comparable to the heating rate, the formation of projections may depend significantly on the heating rate.

Thus, the inventors have conducted studies on whether the formation of projections can be applied to temperature measurement or not, the studies being conducted using thin metal films each having a strictly-controlled quality formed on a substrate and counting the number of projections formed on each thin metal film by heating.

The inventors have investigated the relationship between the projection-forming rate and the heating rate. The results demonstrated that projection formation was a temporally rapid phenomenon and that the number of projections was negligibly affected by the heating rate as long as the heating rate was 1,000° C./min or less. Next, an experiment in which after the temperature of each film reached the initiation temperature of projection formation, the film was held at the temperature for a prolonged period of time was performed. The results demonstrated that the number of projections did not increase while the film was held at the constant temperature. Such a phenomenon is first found by appropriately and strictly controlling the deposition conditions of the thin metal film formed on the substrate. Therefore, in the case where a temperature-measuring member including the thin metal film is used, a specific relationship between the number of projections per unit area on the surface of the thin metal film and the maximum temperature is believed to be present regardless of the heating rate or the holding time at a constant temperature. Furthermore, when the deposition conditions of the thin metal film are changed, the grain size of the thin metal film is changed. The grain size affects the temperature at which the thin metal film is subjected to plastic deformation and the number of projections formed during heating.

Furthermore, the type of substrate having a predetermined thickness and surface roughness and the type of thin metal film to be formed the substrate were determined. The thin metal film was formed under predetermined conditions. Thus, it was found that in this case, the thickness and the surface roughness of the film are primarily determined. Moreover, in the case where the resulting temperature-measuring member was used, it was also found that a specific relationship the maximum temperature of the temperature-measuring member and the number of projections per unit area calculated on the basis of the surface information (image data of shapes of projections or depressions formed on the surface observed with a microscope, the intensity of scattered light, and the intensity of reflected light) due to projections or depressions formed on the surface of the thin metal film is present.

Furthermore, the inventors have speculated that the formation of projections on the surface of a thin aluminum film by heating relates closely to a change (reduction) in the reflectivity of the surface of the thin metal film. The inventors have conducted studies on a change in the reflectivity of the thin metal film between before and after heat treatment with a thin aluminum film formed on a silicon substrate or a glass substrate by sputtering. Therefore, the inventors have found that a specific relationship between the change (reduction) in the reflectivity of the surface of the thin metal film and the maximum temperature of the substrate is present regardless of the heating rate or the holding time at a constant temperature.

The inventors have accomplished the following invention on the basis of the foregoing findings.

To achieve the object, according to an aspect of the present invention, a temperature-measuring member includes a substrate having a thin metal film, the substrate having a smooth surface, the thin metal film being arranged on the substrate, the thin metal film having a smooth surface and a thermal expansion coefficient different from that of the substrate, in which the substrate has a surface roughness Ra of 1 μm or less, the thin metal film has a surface roughness Ra of 0.5 μm or less, and the thin metal film has a thickness of 10 nm to 1,000 μm or less. Thus, the maximum temperature of a target object or atmosphere having been subjected to a temperature profile can be recorded on the thin metal film. Therefore, the use of the temperature-measuring member makes it possible to measure the maximum temperature in a wide range of low to high temperatures without external wiring or generation of impurities or dust.

The substrate is preferably composed of a material selected from the group consisting of silicon, glass, quartz, graphite, SiC, sapphire, and resins. Therefore, the temperature-measuring member is optimized in response to the conditions of a target object or atmosphere.

The thin metal film is preferably composed of at least one material selected from the group consisting of Mg, Al, Si, Ti, Cr, Mn, Fe, Co, Ni, Cu, Zr, Mo, Ru, Pd, Ag, In, Sn, Hf, Ta, W, Pt, Au, and Zn. Therefore, the temperature-measuring member is optimized in response to the conditions of a target object or atmosphere.

A protective film is preferably arranged on the thin metal film. Therefore, the temperature-measuring member is further optimized in response to the conditions of a target object or atmosphere.

According to another aspect of the present invention, a temperature-measuring device configured to measure the maximum temperature of an object or atmosphere in a temperature profile includes (1) a plurality of substrates each provided with a thin metal film, each of the substrates having a smooth surface, and each of the thin metal films having a smooth surface and a thermal expansion coefficient different from that of the substrates, (2) a surface-density-measuring unit configured to measure the surface density of the number of projections or depressions formed on the surface of each of the thin metal films, the thin metal films having been subjected to temperature profiles such that the plurality of substrates each provided with the thin metal film reach different maximum temperatures, (3) a storage unit configured to store data demonstrating the measured surface density of the number of projections or depressions obtained with the surface-density-measuring unit and demonstrating the relationship between the surface density of the number of projections or depressions and the measured maximum temperature, and (4) a temperature-calculating unit configured to determine the maximum temperature of the object or atmosphere having been subjected to a temperature profile on the basis of the relationship between the data stored in the storage unit and the surface density of the number of projections or depressions formed on the surface of the thin metal film of each of the substrates each provided with the thin metal film described in item (1) or substrates each provided with a thin metal film obtained under the same conditions as in item (1), the surface density being measured with the surface-density-measuring unit described in item (2), and the substrates being used as temperature-measuring members placed in an environment of the object or atmosphere subjected to any temperature profile.

The surface-density-measuring unit described in item (2) preferably includes a surface-information collector configured to observe surface shapes of the projections or depressions formed on the surface of each of the thin metal films with a microscope and to record the surface shapes as analog image signals, an AD converter configured to convert the image signals into a digitized form to provide image data sets, and a number-calculating section configured to count only projections or depressions having diameters within a predetermined range in the image data sets and to convert the resulting value into the number of projections or depressions per unit area. The resulting image data sets are excellent. Thus, the image data sets can be converted into the number of projections or depressions per unit area (surface density) by an existing excellent image processing technique.

The predetermined range is preferably 0.1 μm to 30 μm. Thus, the surface density of projections or depressions formed on the surface of each of the thin metal films can be successfully determined from the image data sets.

According to another aspect of the present invention, a method for measuring the maximum temperature of an object or atmosphere in a temperature profile includes (1) preparing a plurality of substrates each provided with a thin metal film, each of the substrates having a smooth surface, and each of the thin metal films having a smooth surface and a thermal expansion coefficient different from that of the substrates, (2) subjecting the plurality of substrates each provided with the thin metal film to temperature profiles such that the plurality of substrates each provided with the thin metal film reach different maximum temperatures, (3) measuring the surface density of the number of projections or depressions formed on the surface of each of the thin metal films having been subjected to the temperature profiles, (4) determining the relationship between the surface density of the number of projections or depressions and the maximum temperature on the basis of measured surface densities of the number of projections or depressions and measured maximum temperatures, (5) placing the substrates each provided with the thin metal film described in step (1) or substrates each provided with a thin metal film obtained under the same conditions as in step (1) in an environment of the target object or atmosphere subjected to any temperature profile, the substrates serving as temperature-measuring members, and (6) measuring the surface density of the number of projections or depressions formed on the surface of the thin metal film of each of the substrates used as the temperature-measuring members, the substrates having been subjected to the temperature profile, and determining the maximum temperature of the target object or atmosphere having been subjected to the temperature profile on the basis of the measured surface density and the relationship between the surface density of the number of projections or depressions determined in step (4) and the maximum temperature.

Each of the steps (3) and (6) of measuring the surface densities preferably includes the substeps of observing surface shapes of the projections or depressions formed on the surface of each of the thin metal films with a microscope and recording the surface shapes as analog image signals, converting the image signals into a digitized form to provide image data sets, and counting only projections or depressions having diameters within a predetermined range in the image data sets and converting the resulting value into the number of projections or depressions per unit area. Thus, an optimum observation unit can be used in response to surface shapes of projections or depressions formed on the surface of each of the thin metal films. Furthermore, the observation unit provides excellent image data sets. Since the excellent image data sets are obtained, the image data sets can be converted into the number of projections or depressions per unit area (surface density) by an existing excellent image processing technique.

The predetermined range is preferably 0.1 μm to 30 μm. Thus, the surface density of projections or depressions formed on the surface of each of the thin metal films can be successfully determined from the image data sets.

Alternatively, each of the steps (3) and (6) of measuring the surface densities preferably includes the substeps of irradiating the projections or depressions formed on the surface of each of the thin metal films with light, detecting light scattered from the surface, and taking the scattered light as analog intensity signals, converting the intensity signals into a digitized form to obtain intensity data sets, and counting only projections or depressions providing the intensity data sets within a predetermined range and converting the resulting value into the number of projections or depressions per unit area. Thus, it is possible to perform temperature measurement different from the temperature measurement on the basis of the image data sets on the surface shapes of the projections or depressions observed with the microscope or the like. In addition, a usual particle counter (alias) can be used in each of the steps of measuring the surface density.

Alternatively, each of the steps (3) and (6) of measuring the surface densities preferably includes the substeps of irradiating the projections or depressions formed on the surface of each of the thin metal films with light, detecting light reflected from the surface, and taking the reflected light as analog intensity signals, converting the intensity signals into a digitized form to obtain intensity data sets, and counting only the intensity data sets within a predetermined range and converting the resulting value into the number of projections or depressions per unit area. Thus, it is possible to perform temperature measurement different from the temperature measurement on the basis of the image data sets on the surface shapes of the projections or depressions observed with the microscope or the like.

Furthermore, to achieve the foregoing object, according to another aspect of the present invention, a temperature-measuring member includes a substrate composed of one material selected from the group consisting of silicon, glass, quartz, graphite, sapphire, and ceramic materials, and a thin aluminum film provided on the substrate, the thin aluminum film having a thickness of 200 nm to 1,800 nm, in which the thin aluminum film has a reflectivity of 80% or more with respect to incident light having a wavelength of 400 nm.

According to another aspect of the present invention, a temperature-measuring device includes a holding unit configured to hold a temperature-measuring member, a light-emitting unit configured to emit incident light having a wavelength of 250 nm to 850 nm toward the surface of a thin aluminum film of the temperature-measuring member, a photoreceptor configured to receive reflected light from the surface of the thin aluminum film, a reflectivity-computing unit configured to calculate the reflectivity of the surface of the thin aluminum film from the intensity of the incident light and the intensity of the reflected light, and a temperature conversion unit configured to convert the calculated reflectivity into a temperature in order to estimate the maximum temperature of the temperature-measuring member having been subjected to a temperature profile.

According to another aspect of the present invention, a method for measuring a temperature includes preparing a temperature-measuring member including a substrate composed of one material selected from the group consisting of silicon, glass, quartz, graphite, sapphire, and ceramic materials, and a thin aluminum film formed on the substrate by sputtering or evaporation, the thin aluminum film having a thickness of 200 nm to 1,800 nm, measuring a reduction in the reflectivity of the thin aluminum film due to projections formed on the surface of the thin aluminum film according to a temperature profile to which the temperature-measuring member has been subjected, and estimating the maximum temperature in the temperature profile on the basis of the reduction in reflectivity.

The reflectivity with respect to incident light having a wavelength of 250 nm to 850 nm is preferably used.

BRIEF DESCRIPTION OF THE DRAWINGS

FIG. 8 is a graph showing the relationship between the incident wavelength and the reflectivity of the surface of a thin aluminum film for each combination of the maximum temperature and the heating rate according to Example 5;

FIG. 9 is a graph showing the relationship between the incident wavelength and the reflectivity of the surface of a thin aluminum film for each heating rate according to Example 7;

DESCRIPTION OF THE PREFERRED EMBODIMENTS

Figure 1:
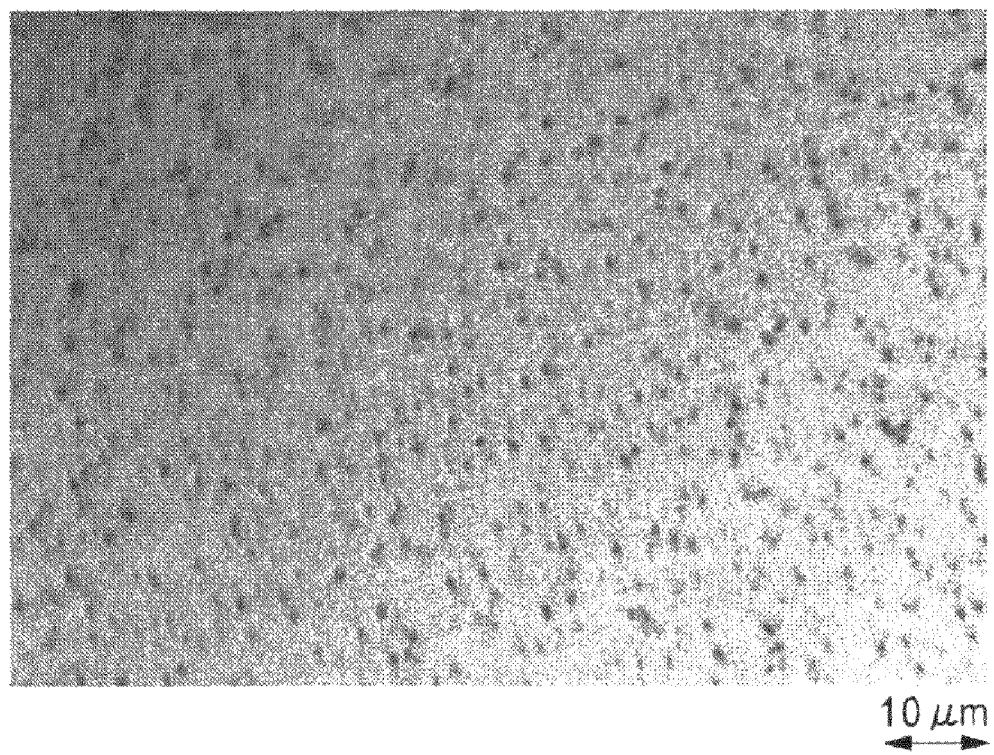
FIG. 1 is a plan view illustrating the surface of a thin metal film after heat treatment according to Example 1.

Embodiments of the present invention will be described in detail below.

(1)
Structure of Temperature-Measuring Member

A temperature-measuring member according to the present invention includes a substrate provided with a thin metal film, the substrate having a smooth surface, and a thin metal film having a smooth surface and having a thermal expansion coefficient different from that of the substrate, the thin metal film being formed on the substrate under specific conditions.

Film-forming conditions for an exemplary temperature-measuring member including a silicon substrate as the substrate and an aluminum film as the thin metal film will be described below.

As a method for forming a thin film composed of pure aluminum, resistance heating deposition or electron beam deposition is often employed. In this method, however, heat generated during deposition causes significant formation of irregularities on the surface of the aluminum film, thereby clouding the surface of the film. A method for measuring a temperature with the temperature-measuring member according to the present invention basically includes observing projections formed by heat treatment. Thus, a film having a rough surface immediately after deposition without any thermal history is undesirable. In other words, the film needs to have a low surface roughness, i.e., the film needs to have a smooth surface. Therefore, deposition is not suitable for forming an aluminum film.

To form a thin aluminum film having a smooth surface, a low-temperature process is required to be employed. Sputtering is suitable as the process. Even in this process, a high film-forming power and a long film-forming time cause irregularities of the surface of the aluminum film, leading to clouding. For example, when a thin aluminum film having a thickness of 1 µm is formed by magnetron sputtering on a silicon wafer serving as a substrate having a thickness of 0.35 mm at an ultimate vacuum of $1.2 \times 10^{-6}$ Torr, a substrate-target distance of 50 mm, a pressure of an Ar atmosphere of 10 mTorr, and a deposition power of 15 W/cm$^2$, the surface of the film is clouded. In contrast, when a thin aluminum film having a thickness of 300 nm is formed on a silicon wafer having a thickness of 0.35 mm at a substrate-target distance of 100 mm, a pressure of an atmosphere of 2 mTorr, and a deposition power of 2 W/cm$^2$, the resulting film has a smooth surface. As described above, to obtain a thin aluminum film having a smooth surface, the film is required to be formed at a low power and a low temperature. A maximum allowable deposition power is 10 W/cm$^2$. A maximum allowable deposition temperature is 100° C. or less (a temperature rise when a film is formed at room temperature).

In accordance with the technical idea of the present invention, various materials may be used in addition to the combination of a silicon substrate and a thin aluminum film. Examples of the materials are described below.

Examples of the material for the substrate include silicon, glass, quartz, graphite, SiC, sapphire, and resins. The substrate composed of any one of the materials may have a surface roughness lower than that formed by irregularities of the thin metal films due to the thermal history. For example, the substrate may have a surface roughness Ra of 5 nm to 1 µm because a substrate having a surface roughness of 5 nm or less is very difficult to make. Therefore, as described in detail below, the number of projections or depressions formed on the surface of the thin metal film of the temperature-measuring member constituted by the substrate having the thin metal film is adequately measured, the projections or depressions being formed due to the thermal history of the member exposed to heat from a target object or atmosphere. Furthermore, an optimum method for measuring the temperature is achieved by selecting the material for the substrate according to the conditions of a target object or atmosphere.

Examples of the material for the thin metal film include Mg, Al, Si, Ti, Cr, Mn, Fe, Co, Ni, Cu, Zr, Mo, Ru, Pd, Ag, In, Sn, Hf, Ta, W, Pt, Au, and Zn. The thin metal film composed of any one of the materials has a thickness of 10 nm to 1,000 µm. The thin metal film has a surface roughness Ra of 5 nm to 0.5 µm because a thin metal film having a surface roughness Ra of 5 nm or less is difficult to make. In the case of the film having the thickness and the surface roughness as described in detail below, the number of projections or depressions formed on the surface of the thin metal film of the temperature-measuring member constituted by the substrate having the thin metal film is adequately measured, the projections or depressions being formed according to the thermal history of the member exposed to heat from a target object or atmosphere. Furthermore, an optimum method for measuring the temperature is achieved by selecting the material for the thin metal film according to the conditions of a target object or atmosphere. The thin metal film is preferably composed of a pure metal. Alternatively, the thin metal film may contain impurities as long as the impurities are sufficiently precipitated and do not affect the formation behavior of, for example, the projections.

Film-forming conditions for a film other than the thin aluminum film will be briefly described below.

In the case of a thin copper (Cu) film, a thick copper oxide film is easily formed. To form a film having a smooth surface, thus, low-temperature film formation in a high vacuum is needed. Also in the case of film formation by magnetron sputtering, a low vacuum is liable to cause oxidation of the surface, resulting in an uneven surface. Thus, an ultimate vacuum of $1 \times 10^{-7}$ Torr or less is needed. In the case of a pure copper thin film having a thickness of 800 nm provided on a silicon substrate, plastic deformation of the surface appears at 250° C. or higher, and oxidation does not proceed up to 500° C.; hence, the pure copper thin film is usable as the temperature-measuring member. At a temperature equal to or higher than the temperature, oxidation proceeds easily, making measurement difficult. The thin copper film is suitable for measurement in a high vacuum at a temperature slightly higher than the temperature suitable for the thin aluminum film.

In the case of tin (Sn), a smooth film is not formed even when the film is formed by sputtering at a low power. However, projections of tin formed by heat grow into big whiskers each having a length of several millimeters. Hence, even if the surface is not so smooth in the initial stage of the film formation, the temperature can be determined by measuring the projections under special conditions. For example, such a tin film is suitable for measurement in the temperature range of about 100° C. to about 300° C. in a dusty environment.

Zinc (Zn) is not suitable for use in a high-vacuum environment, which does not tolerate contamination, because zinc is a readily sublimable metal and can cause contamination of the surrounding environment during heating. However, zinc is suitable for use in a process, such as the hot-dip galvanization of a steel sheet, in which a large amount of zinc is used.

In general, low-melting-point metals, such as Sn, Zn, and indium (In), can measure the maximum temperature in a temperature profile within the low-temperature range of, in particular, 70° C. to 200° C. Aluminum and copper are suitable for the measurement of the maximum temperature in a temperature profile within the temperature range of about 150° C. to about 500° C. High-melting-point metals, such as tungsten (W) and tantalum (Ta), can measure the maximum temperature in a temperature profile within the higher temperature range of, in particular, 250° C. to 700° C. Appropriate combinations of the above-described metals can measure maximum temperatures in various temperature ranges. In the case of a thin silver (Ag) film, a substrate composed of a resin may be used. However, irradiation of the interface between the Ag film and the resin substrate with light simultaneously causes oxidation and reduction of Ag, thereby resulting in the aggregation of Ag and the penetration of Ag into the resin. Thus, the light irradiation is required to be eliminated. Accordingly, if needed, these metals may be appropriately selected according to the conditions of a target object or atmosphere, as described above.

The temperature-measuring member of the present invention described in detail above is used in a method, as described below, for measuring a temperature by measuring the number of projections or depressions formed on the surface of the thin metal film due to the heat history from a target object or atmosphere. However, heating the temperature-measuring member in an air atmosphere may cause oxidation of the surface of the thin metal film of the temperature-measuring member, significantly changing the surface state. For example, in the case where the thin metal film is a thin copper (Cu) film, heating the film in an air atmosphere causes the formation of a surface oxide at 200° C. or higher, so that the surface oxide covers the target irregularities. This makes it difficult to detect the irregularities. In such a case, the formation of a surface protective film having a thickness of 20 nm to 2 μm on the thin metal film inhibits oxidation of the metal surface. As the surface protective film, any oxide film stable at a target temperature may be used. Examples of the material of the protective film that can be conveniently used include $Al_2O_3$, $SiO_2$, MgO, $ZrO_2$, $HfO_2$, $TiO_2$, $Cr_2O_3$, NiO, ZnO, $In_2O_3$, and $Y_2O_3$. The protective film may be formed by physical vapor deposition (PVD), e.g., sputtering or evaporation. A protective film having a thickness of 20 nm or less inevitably has a pinhole and thus is not preferred. A thickness of 2 μm or more causes cracks in the protective film and thus is not preferred. Therefore, a protective film having a thickness of 30 nm to 300 nm is preferred.

Temperature-Measuring Device and Method for Measuring Temperature

A temperature-measuring device according to the present invention configured to measure the maximum temperature of an object or atmosphere in a temperature profile includes (1) a plurality of substrates each provided with a thin metal film, each of the substrates having a smooth surface, and each of the thin metal films having a smooth surface and a thermal expansion coefficient different from that of the substrates and being formed under specific conditions, (2) a surface-density-measuring unit configured to measure the surface density of the number of projections or depressions formed on the surface of each of the thin metal films, the thin metal films having been subjected to temperature profiles such that the plurality of substrates each provided with the thin metal film reach different maximum temperatures, (3) a storage unit configured to store data demonstrating the measured surface density of the number of projections or depressions obtained with the surface-density-measuring unit and demonstrating the relationship between the surface density of the number of projections or depressions and the measured maximum temperature, and (4) a temperature-calculating unit configured to determine the maximum temperature of the object or atmosphere having been subjected to a temperature profile on the basis of the relationship between the data stored in the storage unit and the surface density of the number of projections or depressions formed on the surface of the thin metal film of each of the substrates each provided with the thin metal film described in item (1) or substrates each provided with a thin metal film obtained under the same conditions as in item (1), the surface density being measured with the surface-density-measuring unit described in item (2), and the substrates being used as temperature-measuring members placed in an environment of the object or atmosphere subjected to any temperature profile.

A method according to the present invention for measuring the maximum temperature of an object or atmosphere in a temperature profile includes (1) preparing a plurality of substrates each provided with a thin metal film, each of the substrates having a smooth surface, and each of the thin metal films having a smooth surface and a thermal expansion coefficient different from that of the substrates and being formed under specific conditions, (2) subjecting the plurality of substrates each provided with the thin metal film to temperature profiles such that the plurality of substrates each provided with the thin metal film reach different maximum temperatures, (3) measuring the surface density of the number of projections or depressions formed on the surface of each of the thin metal films having been subjected to the temperature profiles, (4) determining the relationship between the surface density of the number of projections or depressions and the maximum temperature on the basis of measured surface densities of the number of projections or depressions and measured maximum temperatures, (5) placing the substrates each provided with the thin metal film described in step (1) or substrates each provided with a thin metal film obtained under the same conditions as in step (1) in an environment of the target object or atmosphere subjected to any temperature profile, the substrates serving as temperature-measuring members, and (6) measuring the surface density of the number of projections or depressions formed on the surface of the thin metal film of each of the substrates used as the temperature-measuring members, the substrates having been subjected to the temperature profile, and determining the maximum temperature of the target object or atmosphere having been subjected to the temperature profile on the basis of the measured surface density and the relationship between the surface density of the number of projections or depressions determined in step (4) and the maximum temperature.

An exemplary method for measuring a temperature will be described in detail below, the method including preparing a plurality of substrates each provided with a thin metal film in which a thin aluminum film having a thickness of 300 nm is provided on a silicon wafer having a thickness of 0.35 mm, the aluminum film being formed at a substrate-target distance of 100 mm, a deposition gas pressure of 2 mTorr, and a deposition power of 2 $W/cm^2$, and measuring a temperature using the plurality of substrates each provided with the thin metal film.

With respect to the plurality of substrates each having the thin metal film, it is necessary to previously investigate the relationship between the maximum temperature and the number of projections formed on the surface of each of the thin metal films at the maximum temperature with the surface-density-measuring unit described below in detail. The surface-density-measuring unit includes a surface-information collector, an AD converter, and a number-calculating section. Thus, the substrates each provided with the thin metal film were placed in a compact vacuum heat-treatment furnace and heated to a predetermined temperature at a heating rate of 5° C./min. After heating, observations were made on surface shapes of the projections formed on the surface of the thin metal film of each of the substrates each provided with the thin metal film with a microscope. The surface shapes were captured with a CCD camera constituting the surface-information collector to obtain analog image signals. The image signals were digitized into image data with an I/O board serving as the AD converter. The image data was binarized with the number-calculating section. Only projections each having a predetermined diameter range (0.3 μm to 10 μm) were counted, and the number of projections per unit area (hereinafter, referred to as a "surface density") was determined. Projections each having a diameter of 0.3 μm to 10 μm began to form at 150° C. The surface density of the projections was $20\times10E9/m^2$ at 200° C. The surface density of the projections was $60\times10E9/m^2$ at 300° C. In this example, thus, it was found that the relationship between the maximum temperature (T) and the surface density ($X\times10E9/m^2$) was represented by formula (1):

$$T=0.4\times X-60 \; (150° \text{C. to } 300° \text{C.}) \qquad \text{formula (1)}$$

When substrates heated at heating rate of 50° C./min and 100° C./min, the relationship between the maximum temperature (T) and the surface density ($X\times10E9/m^2$) was determined by the same procedure as above and was also represented by formula (1). Furthermore, in the case where substrates were heated to 300° C. at heating rate of 50° C./min and then held for 30 minutes, the relationship is also represented by formula (1). Moreover, when substrates were heated in different atmospheres, i.e., in argon gas, nitrogen gas, and air, the relationship between the maximum temperature (T) and the surface density ($X \times 10E9/m^2$) was also represented by formula (1).

Next, a plurality of substrates each provided with a thin metal film in which a thin aluminum film having a thickness of 300 nm is provided on a silicon wafer having a thickness of 0.35 mm, the aluminum film being formed at a substrate-target distance of 100 mm, a deposition gas pressure of 5 mTorr, and a deposition power of 2 W/cm$^2$, were prepared. The substrates having the thin metal films were heated to 300° C. at a heating rate of 5° C./min. The relationship between the maximum temperature (T) and the surface density ($X \times 10E9/m^2$) was represented by formula (2):

$$T = 0.3 \times X - 45 \text{ (150° C. to 300° C.)} \qquad \text{formula (2)}$$

Next, a plurality of substrates each provided with a thin metal film in which a thin aluminum film having a thickness of 100 nm is provided on a silicon wafer having a thickness of 0.35 mm, the aluminum film being formed at a substrate-target distance of 100 mm, a deposition gas pressure of 5 mTorr, and a deposition power of 2 W/cm$^2$, were prepared. The substrates having the thin metal films were heated to 300° C. at a heating rate of 5° C./min. The relationship between the maximum temperature (T) and the surface density ($X \times 10E9/m^2$) was represented by formula (3):

$$T = 0.13 \times X - 19.5 \text{ (150° C. to 300° C.)} \qquad \text{formula (3)}$$

In this way, different deposition conditions change the number of projections formed. Thus, types, dimensions, and surface roughness of the materials constituting the substrates provided with the thin metal films and the deposition conditions are strictly controlled so as to satisfy predetermined values. However, if only the foregoing control is performed, certain relations hold between the maximum temperature (T) and the surface density ($X \times 10E9/m^2$) regardless of the hearing rate, the holding time of a temperature, or the atmospheric gas.

Thus, data sets demonstrating the preliminarily determined relationships between the maximum temperature (T) and the surface density ($X \times 10E9/m^2$) of the substrates provided with the thin metal films are stored in memory serving as a storage unit. Therefore, the maximum temperature of a target object or atmosphere having been subjected to a temperature profile in a treatment process described below can be determined.

With respect to the calculation of the number of projections formed on each of the thin metal films due to heating, in the case of projections each having a diameter of 0.1 μm or less, it is difficult to detect the projections by reflectivity measurement or with a particle counter or a laser microscope. In the case of projections each having a diameter of 30 μm or more, it is difficult to determine the temperature by measuring projections in microscopic areas because of nonuniform in-plane distribution of the projections. Thus, the temperature is determined by measuring projections each having a diameter of 0.1 μm to 30 μm. Huge projections are mainly formed when the heating temperature is higher than a predetermined measuring range. Thus, to perform accurate temperature measurement, the temperature is preferably determined by measurement in the range in which projections or depressions each having a diameter of 0.3 μm to 10 μm are formed.

As the next step, the substrates each provided with the thin metal film or substrates each provided with a thin metal film obtained under the same conditions as the foregoing substrates are placed in an environment of the target object or atmosphere subjected to any temperature profile, the substrates serving as temperature-measuring members. The surface density of the number of projections formed on the surface of the thin metal film of each of the substrates used as the temperature-measuring members, the substrates having been subjected to the temperature profile, is measured with the same surface-density-measuring unit as above. The maximum temperature of the target object or atmosphere having been subjected to the temperature profile is determined by the temperature-calculating unit on the basis of the measured surface density and the data sets stored in the memory described above.

In this embodiment, the examples in which the substrates composed of silicon and the thin metal films composed of aluminum deposited on the substrates are used have been described in great detail above. However, the present invention is not necessarily limited thereto.

As stated in the description of the structure of the temperature-measuring member according to the present invention, the maximum temperature can be determined by various combinations of the substrates and the thin metal films deposited on the substrates and using surface information on projections and holes as depressions.

In this embodiment, the example in which image signals as the surface information on projections formed on surfaces of the thin metal films are recorded with the surface-information collector including the optical microscope and the CCD camera have been described. Furthermore, the example in which the image data into which the image signals have been digitized with the I/O board is binarized with the number-calculating section and in which the number of projections per unit area (surface density) is determined has been described. However, the present invention is not necessarily limited thereto. For example, a laser microscope may be used as the microscope. The number of projections each having a diameter of 0.1 μm or more can also be measured with the laser microscope. Further smaller projections and holes can be observed with an electron microscope such as a scanning electron microscope (SEM), thereby collecting image information. Alternatively, minute projections are directly measured with a profilometer serving as the surface-information collector, and the surface density may be calculated on the basis of the resulting data on the surface information. In addition, for example, a device (e.g., particle counter) in which the intensity of scattered light is taken as surface information on projections formed on surfaces of thin metal films, only projections providing the scattered light intensity within a predetermined range are counted, and the resulting value is converted into the number of projections per unit area with the number-calculating section may be used. Furthermore, the intensity of reflected light may be used as surface information. The principle utilized in the particle counter (for example, only projections providing the intensity within a predetermined range are counted, and then the resulting value is converted into the number of projections per unit area (surface density)) may also be utilized.

EXAMPLE 1

A thin film having a thickness of 300 nm and composed of aluminum with a purity of 99.99% was formed on a silicon wafer having a thickness of 0.35 mm and a diameter of two inches by sputtering at an ultimate vacuum of $1.2 \times 10^{-6}$ Torr, a substrate-target distance of 100 mm, an argon gas pressure of 2 mTorr during deposition, and a deposition power of 2 W/cm$^2$, thereby preparing a substrate provided with a thin metal film. The substrate provided with the thin metal film was heated in an argon atmosphere at a heating rate of 5° C./min. After heating, observations were made on surface shapes of projections formed on the surface of the thin metal film of the substrate provided with the thin metal film using a microscope. The surface shapes were captured with a CCD camera constituting the surface-information collector to obtain analog image signals. The image signals were digitized into image data with an I/O board serving as the AD converter. The image data was binarized with the number-calculating section. Only projections each having a predetermined diameter range (0.3 μm to 10 μm) were counted, and the number of projections per unit area (surface density) was determined. It was found that the relationship between the maximum temperature (T) and the surface density (X×10E9/m$^2$) was represented by formula (4):

$$T=0.4 \times X-60 \qquad \text{formula (4)}$$

A temperature-measuring member constituted by a substrate provided with a thin metal film prepared under the same conditions as above was placed in a vacuum heat-treatment furnace. A heat test was performed in a vacuum atmosphere at a heating rate of 10° C./min, a preset maximum temperature of 250° C. in the furnace, and a holding time of 30 minutes. In this case, the temperature of the temperature-measuring member was measured with a thermocouple. In fact, the temperature reached 280° C. three minutes after the temperature of the temperature-measuring member reached 250° C. The temperature decreased and stabilized at 250° C. 10 minutes later.

The surface density of the projections formed on the surface of the thin metal film of the temperature-measuring member after heating was determined by the same procedure and found to be 52×10E9/m$^2$. In this case, the maximum temperature was determined to be 280° C. using formula (4). FIG. 1 shows the observation result of the surface shapes of the thin metal film.

Next, a heat test was performed in a nitrogen atmosphere with the vacuum heat-treatment furnace serving as a target object or atmosphere at a heating rate of 10° C./min, a preset maximum temperature of 250° C., and a holding time of 30 minutes. In this case, the temperature reading of a temperature-measuring unit did not reach 250° C. The temperature reading reached 230° C. three minutes later and stabilized at 200° C. 10 minutes layer. The surface density of projections formed on the surface of the thin metal film of the temperature-measuring member after cooling was determined by the same procedure as above and found to be 30×10E9/m$^2$. In this case, the maximum temperature was determined to be 225° C. using formula (4). In this way, the maximum temperature at any point in the furnace can be determined with the temperature-measuring member.

EXAMPLE 2

Figure 2:
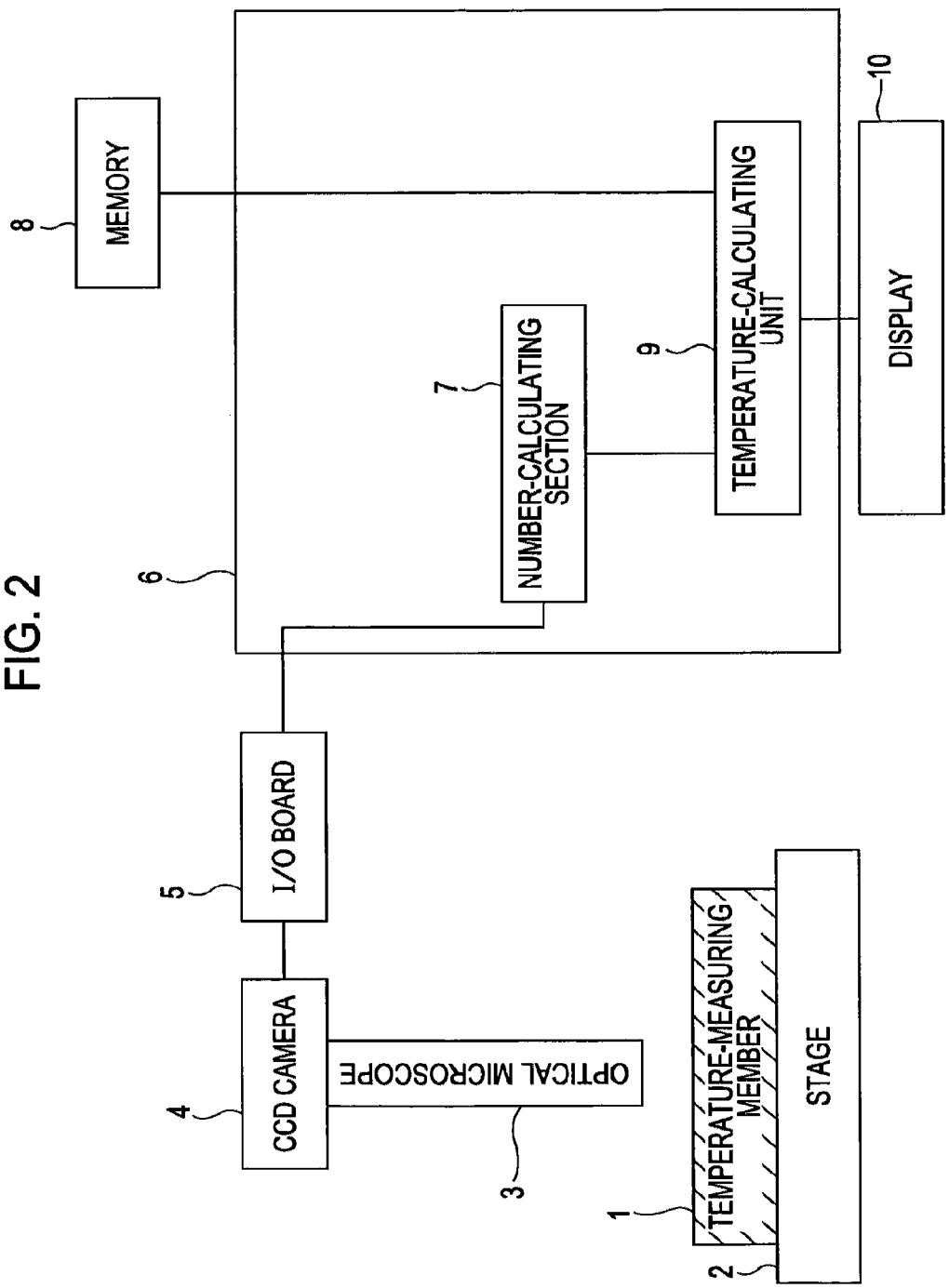
FIG. 2 is a block diagram illustrating a temperature-measuring device according to Example 2.

A temperature-measuring device configured to measure the maximum temperature and a method for measuring a temperature briefly described in Example 1 will be described below. FIG. 2 is a block diagram illustrating a temperature-measuring device according to an embodiment.

FIG. 2 illustrates a temperature-measuring member 1 constituted by a substrate provided with a thin metal film, the substrate being placed in a vacuum heat-treatment furnace serving as a target object and subjected to a temperature profile as described in Example 1; a stage 2 supporting the temperature-measuring member 1; an optical microscope 3 used in observing shapes of projections formed on the surface of the thin metal film; a CCD camera 4 that is attached to the optical microscope 3 and feeds analog image signals; an I/O board 5 configured to digitize the output signals supplied from the CCD camera 4 and feed image data sets; an arithmetic processing unit 6 connected to the I/O board; a number-calculating section 7 configured to binarize the digitized image data sets supplied from the I/O board 5, count only projections each having a predetermined diameter range, and calculate the surface density (X×10E9/m$^2$); memory 8 as a storage unit configured to store data on the relationship between the maximum temperature (T) and the surface density (X×10E9/m$^2$) of the substrate provided with the thin metal film determined by a preliminary experiment in which the substrate provided with the thin metal film have been subjected to a temperature profile; a temperature-calculating unit 9 configured to determine the maximum temperature (T) of the vacuum heat-treatment furnace from the surface density of the temperature-measuring member 1 having been subjected to the temperature profile in the vacuum heat-treatment furnace serving as a target object, the surface density being calculated with the number-calculating section 7, and from the data stored in the memory 8, the data concerning the relationship between the maximum temperature (T) and the surface density (X×10E9/m$^2$); and a display 10 configured to display the temperature determined with the temperature-calculating unit 9.

The shapes of the projections formed on the surface of the thin metal film are observed with a unit such as the optical microscope 3. The surface shapes are recorded with the CCD camera 4 as analog image signals. The I/O board 5 converts the analog image signals into digital image data sets. Thus, the resulting image data sets are significantly excellent. Furthermore, an existing excellent image processing technique can be employed because of the use of the CCD camera 4, the I/O board 5, and the number-calculating section 7.

EXAMPLE 3

A thin film having a thickness of 300 nm and composed of aluminum with a purity of 99.99% was formed on a silicon wafer having a thickness of 0.625 mm and a diameter of six inches by sputtering at an ultimate vacuum of 1.2×10$^{-6}$ Torr, a substrate-target distance of 100 mm, an argon gas pressure of 3 mTorr during deposition, and a deposition power of 2.8 W/cm$^2$, thereby preparing a substrate provided with a thin metal film.

The substrate provided with the thin metal film was subjected to heat treatment in a vacuum heat-treatment furnace. The heating rate was set at 5° C./min. The substrate was heated to a predetermined temperature, held for 10 minutes at the temperature, and then naturally cooled. In this case, the temperature of the center of the substrate provided with the thin metal film was measured using a temperature-measuring wafer with thermocouples (manufactured by SensArray Corporation), and the maximum temperature was recorded. The number of projections formed on the surface of the thin metal film of the substrate provided with the thin metal film after the heat treatment was measured with a particle counter manufactured by Topcon Corporation. In this case, the number of projections per wafer (hereinafter, referred to as "the number of particles") represents the number of projections each having a diameter of 1 μm on the entire surface of the 6-inch wafer. Table 1 shows the resulting maximum temperature and the number of particles of the substrate provided with the thin metal film.

TABLE 1

| Temperature °C. | Number of particles/ 6-inch wafer |
|---|---|
| 148 | 0 |
| 161 | 1671 |
| 182 | 5149 |
| 233 | 16791 |
| 274 | 26830 |
| 336 | 40131 |
| 374 | 50369 |

Figure 3:
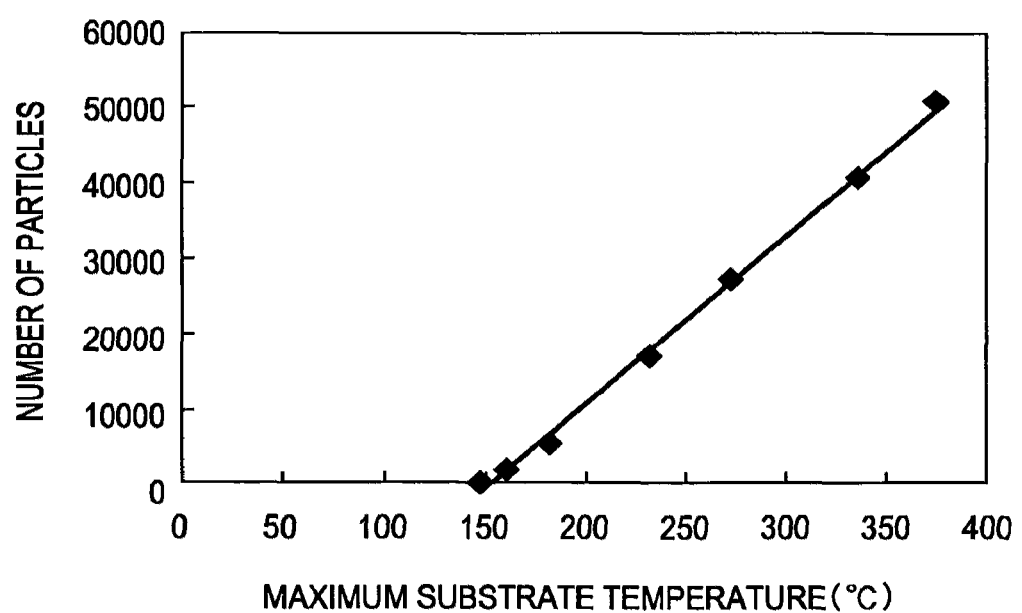
FIG. 3 is a graph showing the relationship between the maximum substrate temperature and the number of particles.
Figure 4C:
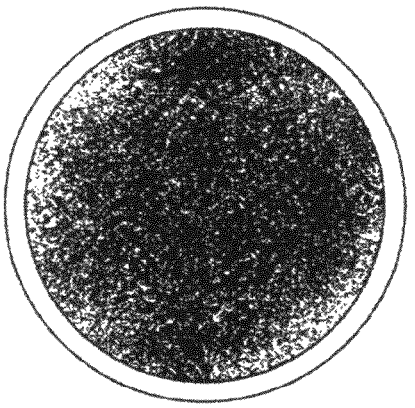
FIGS. 4A to 4F are distribution diagrams illustrating the relationship between the maximum temperature of the substrate and the distribution of the projections formed on the thin metal film according to Example 3.
Figure 4F:
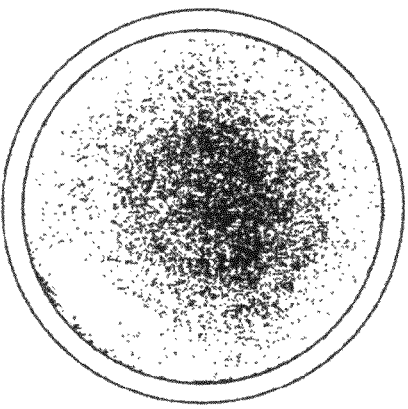
Figure 4B:
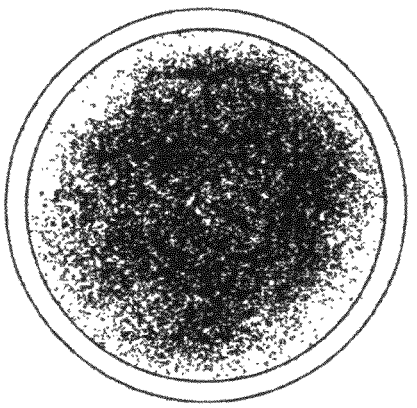
Figure 4E:
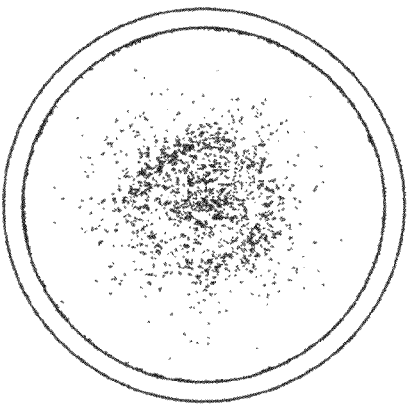
Figure 4A:
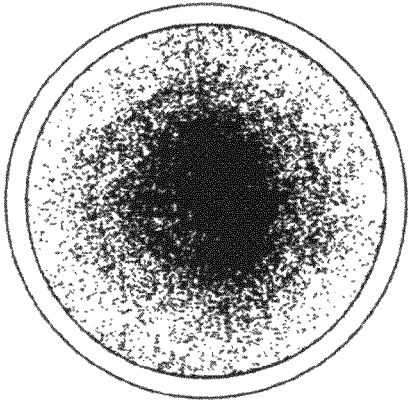
Figure 4D:
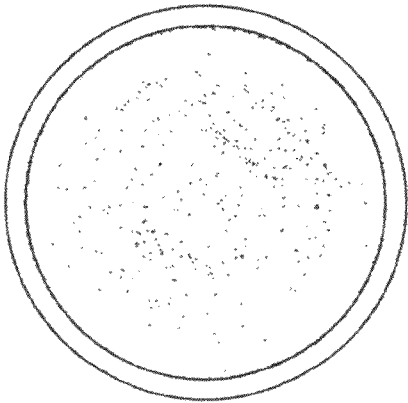

FIG. 3 is a graph showing the relationship between the maximum substrate temperature and the number of particles. The graph shown in FIG. 3 demonstrated that the relationship between the maximum temperature (T) of the substrate and the number of particles (n) was represented by formula (5). Data sets expressed as formula (5) were stored in the storage unit and used in a temperature measurement algorithm described below.

$$N = 225 \times T - 34645 \quad \text{formula (5)}$$

FIGS. 4A to 4F are distribution diagrams illustrating the relationship between the maximum temperature of the substrate and the distribution of the projections formed on the thin metal film arranged on the 6-inch wafer determined using the particle counter.

The particle counter described above corresponds to the surface-density-measuring unit described above. Thus, the method for measuring the maximum temperature and the temperature-measuring device described in Example 2 can be applied to the subsequent procedure and a system used. Therefore, a detailed description is omitted.

As described above, according to the present invention, it is possible to provide the temperature-measuring member that eliminates the need for external wiring and can measure the maximum temperature in a wide temperature range from low to high temperatures without the generation of impurities or dust. Furthermore, it is possible to provide a temperature-measuring device and a method for measuring a temperature.

<2>
Structure of Temperature-Measuring Member

A temperature-measuring member according to the present invention has a structure in which a thin aluminum film having a thickness of 200 nm to 1,800 nm is formed by sputtering or evaporation on a substrate selected from the group consisting of silicon substrates, glass substrates, and ceramic substrates.

The reason the temperature-measuring member has the structure will be described in detail below.

The inventors have studied how projections are formed on surfaces of thin aluminum films arranged on a silicon substrate and a glass substrate during heating, the films being formed by sputtering. The inventors have conducted the following studies on whether the formation of projections can be applied to temperature measurement or not.

The inventors have investigated the relationship between the projection-forming rate and the heating rate. The results demonstrated that projection formation was a temporally rapid phenomenon and that the temperature of initiation of projection formation was negligibly affected by the heating rate. Next, an experiment in which after the temperature of each film reached the initiation temperature of projection formation, the film was held at the temperature for a prolonged period of time was performed. The results demonstrated that the number of projections did not increase while the film was held at the constant temperature. Therefore, in the case where the thin metal film formed under such properly selected conditions is used, a specific relationship between the state of projections formed on the surface of the thin metal film and the maximum temperature of the substrate is believed to be present regardless of the heating rate or the holding time at a constant temperature.

Furthermore, the inventors have speculated that the formation of projections of the surface of the thin metal film relates closely to a change (reduction) in the reflectivity of the surface of the thin metal film. The inventors have conducted studies on a change in the reflectivity of the thin metal film between before and after heat treatment and have found that a specific relationship between the change (reduction) in the reflectivity of the surface of the thin metal film and the maximum temperature of the substrate is present regardless of the heating rate or the holding time at a constant temperature.

Moreover, the inventors have found that the following conditions are preferred or required in order to make a thin aluminum film arranged on the silicon or glass substrate usable as a practical temperature-measuring member.

The roughness of the initial surface of the thin metal film (before temperature measurement) is preferably minimized. Thus, for sputtering, the Ar gas pressure during deposition is preferably 10 mTorr or less because excessively high gas pressures are liable to cause irregularities on the surface of an as-deposited aluminum film.

An excessively small thickness of the aluminum film reduces the number of projections formed by heat treatment and reduces a change in reflectivity between before and after heat treatment, thus making measurement difficult. An excessively large thickness increases the number of projections formed by heat treatment, thus increasing the absolute value of the reduction in reflectivity between before and after heat treatment. However, a thin film having an uneven surface is liable to be formed during deposition, thus clouding the surface of the thin film. Hence, the film cannot be used for reflectivity measurement. Therefore, the thin aluminum film should have an appropriate thickness. The thickness is in the range of 200 nm to 1,800 nm, preferably 300 nm to 1,600 nm, and more preferably 550 nm to 1,200 nm.

An increase in the temperature of the substrate during deposition also causes an uneven surface. Thus, the substrate temperature during deposition needs to be maintained at 100° C. or lower. Furthermore, a low ultimate vacuum causes the clouding of the surface due to contamination of impurities. Thus, the ultimate vacuum should be a high degree of vacuum, i.e., $2.0 \times 10^{-6}$ Torr or less (1 Torr=(101325/760) Pa).

The thin aluminum film having a thickness within the predetermined range formed on a silicon or glass substrate under the controlled conditions serves as a practical temperature-measuring member.

Temperature-Measuring Device and Method for Measuring Temperature

A temperature-measuring device according to the present invention has the following structure.

That is, the temperature-measuring device includes a holding unit configured to hold the above-described temperature-measuring member according to the present invention, a light-emitting unit configured to emit incident light having a wavelength of 250 nm to 850 nm toward the surface of a thin aluminum film of the temperature-measuring member, a photoreceptor configured to receive reflected light from the surface of the thin aluminum film, a reflectivity-computing unit configured to calculate the reflectivity of the surface of the thin aluminum film from the intensity of the incident light and the intensity of the reflected light, and a temperature conversion unit configured to convert the calculated reflectivity into a temperature in order to estimate the maximum temperature of the temperature-measuring member having been subjected to a temperature profile.

As the structure including the holding unit, the light-emitting unit, the photoreceptor, and the reflectivity-computing unit, the typical structure of a commercially available reflectivity-measuring device may be used.

A method for measuring a temperature according to the present invention includes preparing the temperature-measuring member described above, measuring a reduction in the reflectivity of the thin aluminum film due to projections formed on the surface of the thin aluminum film according to a temperature profile to which the temperature-measuring member has been subjected, and estimating the maximum temperature in the temperature profile on the basis of the reduction in reflectivity.

The method for measuring a temperature will be described in detail below. The case where temperature measurement is performed with a temperature-measuring member including a thin aluminum film having a thickness of 600 nm arranged on a silicon substrate having a thickness of 0.625 mm is taken as an example.

The silicon substrate (thickness: 0.625 mm) provided with the as-deposit aluminum film (thickness: 600 nm) is slightly warped so as to concave the aluminum-film side of the silicon substrate. A tensile stress is applied to the thin aluminum film. In the case where the temperature-measuring member is heated in vacuum, the temperature-measuring member begins to warp so as to concave the substrate side because the thin aluminum film is thermally expanded, so that a compressive stress is applied to the thin aluminum film. Thus, the thin aluminum film is elastically deformed. At about 150° C., the maximum compressive stress is applied to the thin film, and then the thin film begins to deform plastically. A further increase in temperature initiates the formation of projections each having a diameter of 0.3 to 1 µm and a height of 0.3 to 1 µm on the surface of the thin film. The compressive stress decreases as the number of projections increases. The stress is substantially zero at about 350° C. When the temperature is increased, a change in stress is not observed. However, the number of projections is increased. After the temperature-measuring member is cooled, the projections remain on the surface of the thin film. The formation of the projections reduces the reflectivity of the surface of the thin film.

An example in which the temperature-measuring member is heated at a heating rate of 5° C./min in a vacuum heat-treatment furnace under an argon stream will be described below. The reflectivity of the surface of the thin aluminum film is 86.6% at 250 nm, 90.8% at 400 nm, 90.3% at 600 nm, and 85.0% at 850 nm. The reflectivity is not changed up to 150° C. after the initiation of the heat treatment.

At 150° C. or higher, the reflectivity begins to decrease gradually in the entire wavelength range of 250 nm to 850 nm. At 340° C., the reflectivity decreased to 70.0% at 250 nm, 77.5% at 400 nm, 80.7% at 600 nm, and 77.8% at 850 nm.

In this example, in the case where reflectivity with respect to incident light having a wavelength of 400 nm is used, it was found that the relationship between the maximum temperature T (° C.) and the reflectivity X (%) was represented by formula (6):

$$X=101-T\times 0.07 \ (150° \text{C. to } 400° \text{C.}) \quad \text{formula (6)}$$

Furthermore, in the case where the film was heated to 340° C. and then held at the temperature, the reflectivity was not changed regardless of the presence or absence of the holding time and regardless of a long or short holding time.

Next, the same experiment was performed as above, except that the heating rate was increased to 50° C./min. It was found that the same relational expression as formula (6) was obtained. Also in the case where the film was heated to 300° C. for 10 seconds by rapid thermal annealing (RTA), it was found that the same relational expression as formula (6) was obtained.

In general, changes of the deposition conditions such as the film thickness and changes of the type and thickness of the substrate result in the change of the state of formation of projections. Thus, in the case where temperature measurement is performed by the method according to the present invention, the substrate of the temperature-measuring member and the deposition conditions must be determined. However, once the deposition conditions are determined, the formation of projections depends on the maximum temperature alone regardless of the heating rate or the holding time at a certain temperature. Thus, a preliminary experiment is performed to determine a relational expression similar to formula (6), so that it is possible to measure a temperature ranging from 150° C. at which projections begin to form to 660° C. at which aluminum melts. Therefore, the present invention is applied to temperature measurement within the range of 150° C. to about 600° C., the temperature range being often used in the fields of the manufacture of semiconductors and liquid-crystal devices.

Furthermore, in this example, even when the atmosphere is changed from the argon stream to a nitrogen stream or air, the relationship between the maximum temperature and the reflectivity represented by formula (6) was surely maintained. Thus, temperature measurement regardless of the type of atmosphere can be performed by the method according to the present invention.

To simply perform the measurement of the reflectivity, the reflectivity measurement is preferably performed in or around the visible light range. The wavelength range is preferably in the range of 250 nm to 850 nm.

In addition, to perform more stable measurement of the reflectivity, the reflectivity of an as-deposited aluminum film is preferably maximized. The aluminum film preferably has a reflectivity of 80% or more and more preferably 90% or more at 400 nm. In the case where the thin aluminum film has a thickness of 460 nm, an as-deposited film has a reflectivity of 90% or more in the wavelength range of 350 nm to 600 nm. Thus, from the viewpoint of stable measurement of the reflectivity, the reflectivity is preferably measured in the wavelength range above. At shorter wavelengths, a more significant reduction in reflectivity due to heat treatment is observed. Thus, from the viewpoint of clearly detecting the reduction in reflectivity, the reflectivity is preferably measured at a shorter wavelength. However, disadvantageously, a shorter wavelength slightly increases variations in the measurements of the reflectivity. In general consideration of these points, the wavelength is most preferably in the range of 300 nm to 500 nm.

Furthermore, as exemplified in the method for measuring a temperature according to the present invention, a method for calculating a temperature (maximum temperature) by substituting a reflectivity value for a relational expression, determined by a preliminary experiment, similar to formula (6) may be employed as a method for converting the reflectivity into a temperature with the temperature conversion unit of the temperature-measuring device according to the present invention.

MODIFICATIONS

In the foregoing embodiments, silicon or glass is exemplified as a material constituting the substrate. A material for the substrate suitably used for the formation of a thin aluminum film may be hard and have a smooth surface and a thermal expansion coefficient smaller than that of aluminum. Examples thereof include quartz, graphite, sapphire, and ceramic materials, such as silicon carbide, silicon nitride, aluminum nitride, and aluminum oxide, commonly used for substrates for use in the fields of manufacture of semiconductors and liquid-crystal devices. The surface of the substrate may be smoother than projections formed by heat treatment. Thus, the substrate preferably has a surface roughness of 1 μm or less in terms of Ra.

In the foregoing embodiments, sputtering is exemplified as a method for forming the thin aluminum film on the substrate. Alternatively, evaporation may be employed.

EXAMPLE 4

Effect of Heat Treatment Temperature on Reflectivity (Part 1)

Thin films each having a thickness of 600 nm and composed of aluminum with a purity of 99.9% by mass were formed on silicon wafers each having a thickness of 0.625 mm and a diameter of six inches (about 15 mm) with a magnetron sputtering system, thereby preparing temperature-measuring members. The deposition conditions with the system were as follows: ultimate vacuum: $1.2 \times 10^{-6}$ Torr, gas (atmospheric gas): Ar gas, gas pressure (atmospheric gas pressure): 2 mTorr, deposition power: 2 W/cm$^2$, substrate-target distance: 100 mm, and type of discharge: DC discharge.

The reflectivity was measured in the wavelength range of 250 nm to 850 nm with a reflectivity-measuring device at an incident angle of 5° and a reflection angle of 5° with respect to the direction perpendicular to the surface of the thin aluminum film of each of the temperature-measuring members. The measurements are expressed as a curve of "without heat treatment" in FIG. 5. The reflectivity at a wavelength of 400 nm was 90.8%.

Figure 5:
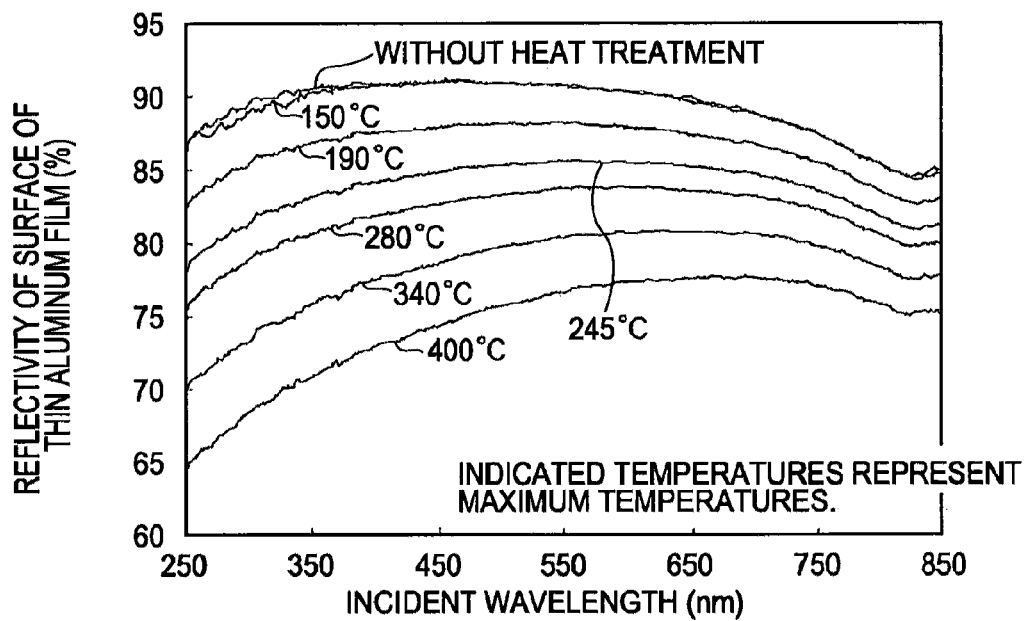
FIG. 5 is a graph showing the relationship between the incident wavelength and the reflectivity of the surface of a thin aluminum film for each maximum temperature according to Example 4.

Next, the temperature-measuring member was heated with a vacuum heat treatment device at a heating rate of 5° C./min. In the heat-treatment experiments, five maximum temperatures were set in the range of 150° C. to 400° C. Each of the temperature-measuring members reached a corresponding one of the maximum temperatures and then was held for 30 minutes at the temperature. The temperature of each of the temperature-measuring members was measured using a temperature-measuring wafer with thermocouples (manufactured by SensArray Corporation). After the heat treatment, the reflectivity was measured under the same conditions as in the reflectivity measurement before the heat treatment. FIG. 5 shows the measurements in addition to the curve of "without heat treatment". As is apparent from the figure, the results demonstrated that the heat treatment in which the maximum temperature was set at 150° C. or higher resulted in a reduction in the reflectivity of the surface of each of the thin aluminum films and that the reflectivity decreased with increasing maximum temperature.

Figure 6:
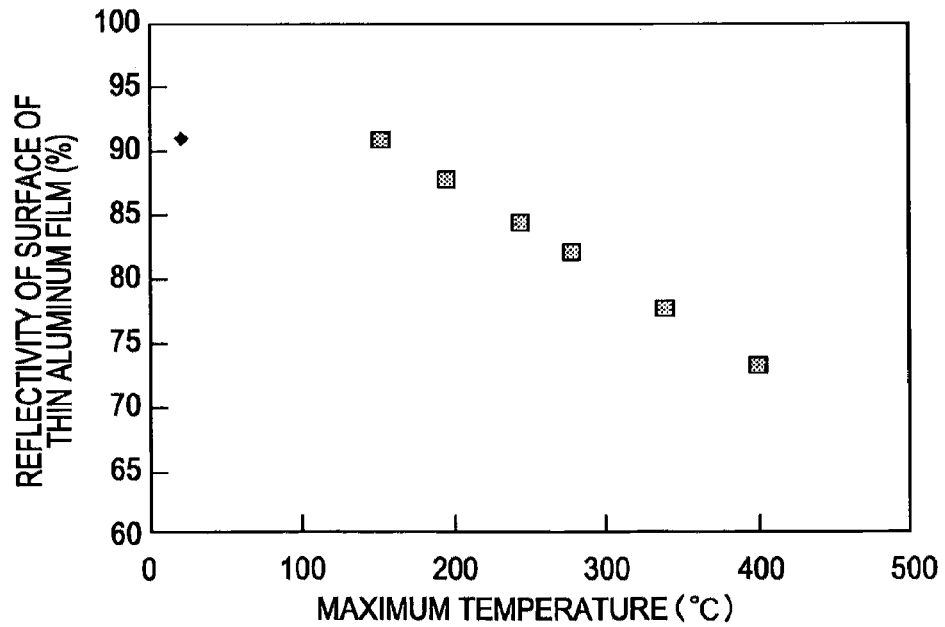
FIG. 6 is a graph showing the relationship between the maximum temperature and the reflectivity of the surface of the thin aluminum film according to Example 4.

FIG. 6 shows the relationship between the reflectivity and the maximum temperature at an incident wavelength of 400 nm. From the figure, the relationship between the reflectivity X (%) and the maximum temperature T (° C.) at a wavelength of 400 nm is represented by formula (6) described again below:

$$X = 101 - T \times 0.07 \ (150° C. \text{ to } 400° C.) \quad \text{formula (6)}$$

Therefore, the maximum temperature T is determined by heating the temperature-measuring member in a target atmosphere, measuring the reflectivity X at a wavelength of 400 nm, and substituting the value of X for formula (6).

Figure 7C:
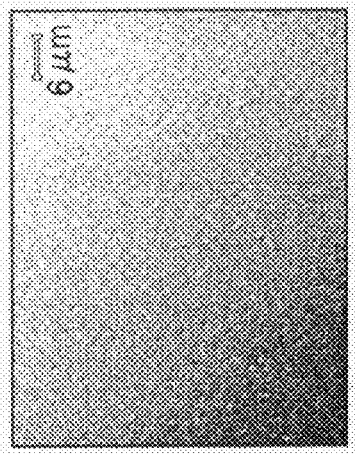
FIGS. 7A to 7F are plan views illustrating the surfaces of the thin aluminum films before and after heat treatment.
Figure 7F:
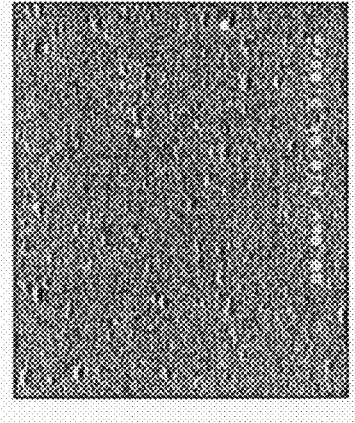
Figure 7B:
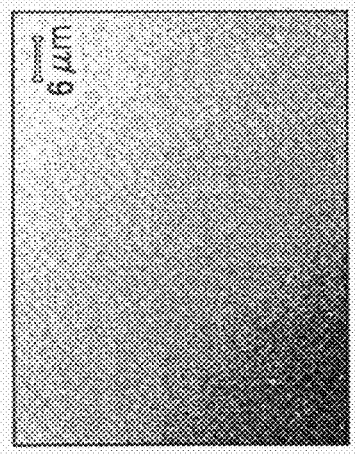
Figure 7E:
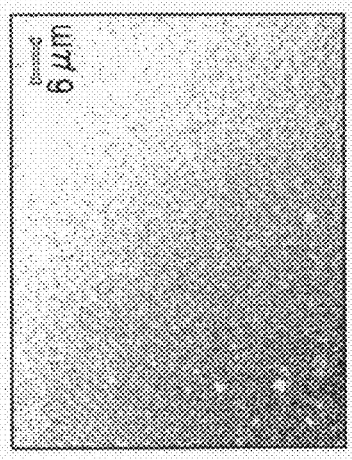
Figure 7A:
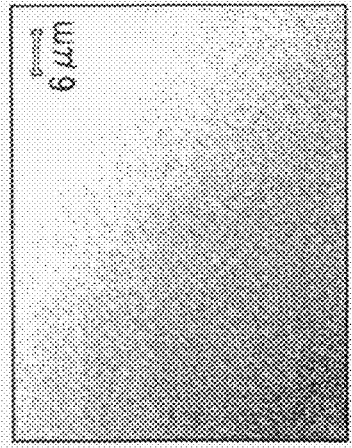
Figure 7D:
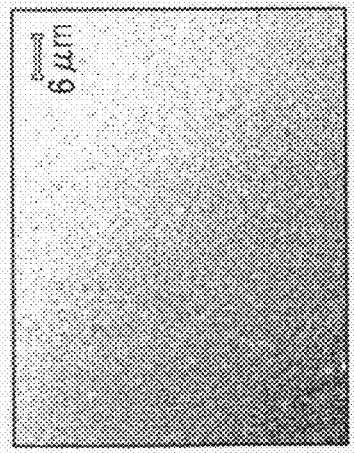

FIGS. 7A to 7F show the observations of the surfaces of the thin aluminum films with a differential interference microscope and a SEM. As is apparent from the figures, before the heat treatment, the thin film had a very smooth surface and substantially no projections or depressions. After the heat treatment in which the maximum temperature was set at 150° C., projections began to form on the surface of the thin film. The number of projections formed on the surface of each of the thin films increased with increasing maximum temperature. (Among the figures, FIGS. 7A to 7E are photographs of the film surfaces with the differential interference microscope. It was unclear whether many whitish points shown in these figures were projections or holes. Thus, the sample shown in FIG. 7E was observed with the SEM. FIG. 7F clearly shows that almost all whitish points were projections). Consequently, it is speculated that an increase in the absolute value of the reduction in reflectivity with increasing heat treatment temperature (maximum temperature) is attributed to an increase in the number of projections.

EXAMPLE 5

Effect of Heating Rate on Reflectivity

Temperature-measuring members prepared as in Example 4 were heated to maximum temperatures of 340° C. and 400° C. at a heating rate of 30° C./min, and then the reflectivity was measured. FIG. 8 shows the results. The difference in reflectivity between the members heated at different heating rates is within 1% throughout an incident wavelength range of 250 to 850 nm at both maximum temperatures of 340° C. and 400° C. Furthermore, the difference is within 0.5% in the incident wavelength range of 250 to 500 nm. Thus, the temperature-measuring members are usable under any heating rate. In the case of the reflectivity measurement at a wavelength of 400 nm, formula (6) is applicable.

EXAMPLE 6

Effect of Thickness of Thin Aluminum Film on Reflectivity

Temperature-measuring members having thin aluminum films various thicknesses were prepared as in Example 4. The temperature-measuring members were heated to 340° C. with a vacuum heat treatment device at a heating rate of 5° C./min and then held for 30 minutes at the temperature. Table 2 shows the measurements of reflectivity of the surface of the thin aluminum film of each of the temperature-measuring members before and after the heat treatment. The reflectivity in the table represents reflectivity at a wavelength of 400 nm.

TABLE 2

| Sample | Thickness of thin aluminum film (nm) | Reflectivity of surface of thin aluminum film (%) Before heat treatment [A] | Reflectivity of surface of thin aluminum film (%) After heat treatment [B] | Reduction in reflectivity [A] − [B] (%) | Remarks |
|---|---|---|---|---|---|
| 1 | 100 | 91.5 | 90.1 | 1.4 | Comparative example |
| 2 | 200 | 91.4 | 88.3 | 3.1 | Example |
| 3 | 300 | 91.4 | 84.1 | 7.3 | Example |
| 4 | 550 | 90.7 | 80.3 | 10.4 | Example |
| 5 | 600 | 90.8 | 77.6 | 13.2 | Example |

TABLE 2-continued

| Sample | Thickness of thin aluminum film (nm) | Reflectivity of surface of thin aluminum film (%) | | Reduction in reflectivity [A] − [B] (%) | Remarks |
|---|---|---|---|---|---|
| | | Before heat treatment [A] | After heat treatment [B] | | |
| 6 | 900 | 90.7 | 72.2 | 18.5 | Example |
| 7 | 1200 | 90.1 | 70.2 | 19.9 | Example |
| 8 | 1500 | 86.5 | 69.5 | 17.0 | Example |
| 9 | 1800 | 81.2 | 68.8 | 12.4 | Example |
| 10 | 2000 | 70.3 | 67.5 | 2.8 | Comparative example |

Sample 1 with 100-nm-thick film is not suitable for the temperature measurement because a reduction in reflectivity due to the heat treatment is small. Thus, sample 1 is described as a comparative example. Each of samples 2 to 9 each having the aluminum film with a thickness of 200 to 1,800 nm is suitable for the temperature measurement because the reflectivity before the heat treatment is 80% or more and because a reduction in reflectivity due to the heat treatment is 3% or more. Thus, samples 2 to 9 are described as examples of the present invention. Among these examples, when the thickness is 1,600 nm or less, the reflectivity before the heat treatment is 85% or more, which is preferred. When the thickness is 1,200 nm or less, the reflectivity before the heat treatment is 90% or more, which is more preferred. In the case where the thickness is in the range of 550 nm to 1,200 nm, most preferably, the reflectivity before the heat treatment is 90% or more, and a reduction in reflectivity due to the heat treatment at 340° C. is 10% or more.

EXAMPLE 7

Effect of Type of Substrate on Reflectivity

Thin aluminum films each having a thickness of 600 nm were formed on glass substrates each having a diameter of 2 inches (about 50 mm) and a thickness of 0.7 mm (#1737, manufactured by Corning Incorporated) in place of the silicon substrate used in Example 4 under the same deposition conditions as those in Example 4, thereby preparing temperature-measuring members. The temperature-measuring members were heated to various maximum temperatures at heating rates of 5° C./min and 30° C./min in air with a heat treatment device.

FIG. 9 shows the reflectivity at a wavelength of 400 nm of the surface of the thin aluminum film of each of the temperature-measuring members before and after the heat treatment. In both heating rates, substantially the same proportional relationship between the maximum temperature and the reduction in reflectivity is observed in the range of 150° C. to 400° C. Thus, the glass substrates are usable as the temperature-measuring members.

EXAMPLE 8

Effect of Heat Treatment Temperature on Reflectivity (Part 2)

In Example 4, the effect of the heat treatment temperature on reflectivity was investigated only at temperatures up to 400° C. In this example, to examine a temperature range in which the temperature-measuring member according to the present invention is usable, experiments were performed also at high temperatures exceeding 400° C.

In this example, temperature-measuring members were prepared with the same device under the same conditions as in Example 4, except that the thin aluminum films each had a thickness of 300 nm.

The reflectivity was measured with a reflectivity-measuring device using incident light having a wavelength of 400 nm under the conditions of an incident angle of 5° and a reflection angle of 5° with respect to the direction perpendicular to the surface of the thin aluminum film of each of the temperature-measuring members.

Figure 10:
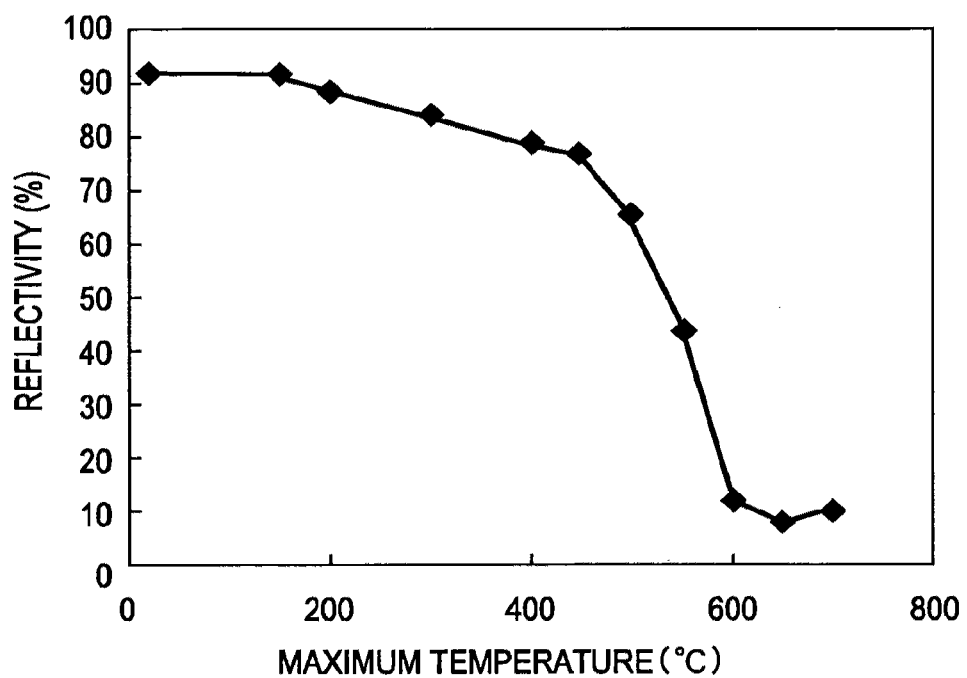
FIG. 10 is a graph showing the relationship between the maximum temperature and the reflectivity of the surface of a thin aluminum film according to Example 8.

Unlike Example 4, an air heating furnace was used in this example. The temperature-measuring members were heated at the same heating rate as in Example 4, i.e., 5° C./min. In the heat-treatment experiments, 10 maximum temperatures were set in the range of 150° C. to 700° C. Like Example 4, each of the temperature-measuring members reached a corresponding one of the maximum temperatures and then was held for 30 minutes at the temperature. The temperature of the atmosphere in the furnace was measured with a thermocouple. The maximum temperature of each of the temperature-measuring members was measured using a temperature-measuring wafer with thermocouples (manufactured by SensArray Corporation) as in Example 4. After the heat treatment, the reflectivity was measured under the same conditions as in the reflectivity measurement before the heat treatment. FIG. 10 shows the measurements in addition to the reflectivity before the heat treatment. As is apparent from the figure, the results demonstrated that in the case where the maximum temperature (heat treatment temperature) was in the range of 150° C. to 450° C., the reflectivity decreased linearly with increasing maximum temperature and that in the case where the maximum temperature was more than 450° C. and up to 650° C., the reflectivity did not decrease linearly but tended to decrease with increasing maximum temperature. However, in the case of the maximum temperature (heat treatment temperature) exceeding 650° C., the reflectivity did not decrease with increasing maximum temperature. Thus, it was found that the temperature-measuring member was usable in the range of 150° C. to 650° C.

EXAMPLE 9

Experiment of Nonuniform Heat Treatment

Figure 11:
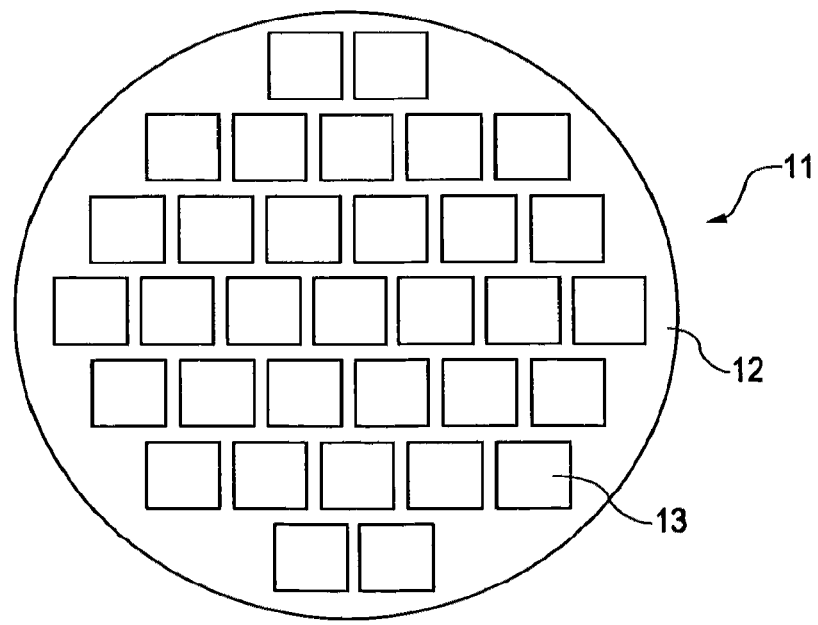
FIG. 11 is a plan view showing a temperature-measuring member used in Example 9.

In this example, a temperature-measuring member was prepared with the same device under the same conditions as in Examples 4 and 8. Thin aluminum films each had a thickness of 300 nm as in Example 8. As shown in FIG. 11, many thin aluminum films 13 each in the form of a square having a side of 10 mm were formed on a silicon substrate 12 with a metal mask, the thin aluminum films 13 being arrayed in a matrix.

Figure 12:
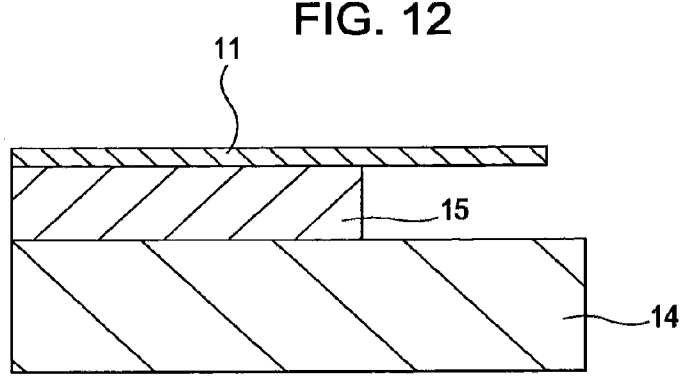
FIG. 12 is a longitudinal sectional view illustrating the arrangement of the temperature-measuring member in a heat-treatment furnace according to Example 9.

To perform a heat-treatment experiment under simulated uneven heat-treatment conditions, as shown in FIG. 12, a sintered alumina plate 15 having a thickness of 5 mm was disposed between a heater 14 in the heat-treatment furnace and the temperature-measuring member 11 in such a manner that the sintered alumina plate 15 was in contact with about two-thirds of the temperature-measuring member 11 and that the remaining about one-third of the temperature-measuring member 11 floated in the air.

The temperature-measuring member was held for 10 minutes in an atmosphere having a temperature of 600° C. (maximum temperature) in the furnace while this arrangement was maintained, followed by cooling.

Figure 13:
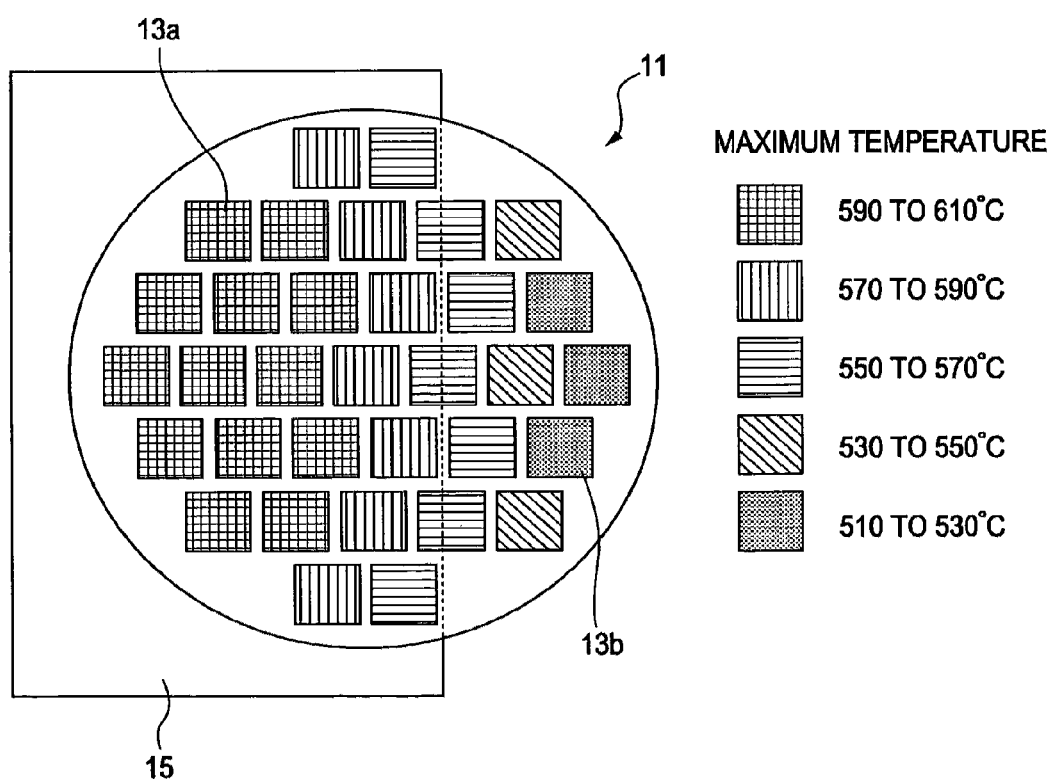
FIG. 13 is a plan view illustrating the distribution of the maximum temperature of the temperature-measuring member according to Example 9.

After the heat treatment, the reflectivity was measured with a reflectivity-measuring device using incident light having a wavelength of 400 nm under the conditions of an incident angle of 5° and a reflection angle of 5° with respect to the direction perpendicular to the substrate. The maximum temperature of each of the thin films was calculated from the reflectivity. FIG. 13 illustrates the distribution of the maximum temperatures. The calculation of the maximum temperature from the reflectivity was performed using a formula derived from the relationship between the reflectivity and the maximum temperature shown in FIG. 10 obtained in Example 8.

As is apparent from FIG. 13, maximum temperatures of thin aluminum films 13a located above the middle portion of the sintered alumina plate 15 reached 590° C. to 610° C. In contrast, thin aluminum films 13b completely floating in the air did not reach 550° C. Thus, it was found that the maximum temperature distribution can be measured with high accuracy by the method for measuring a temperature according to the present invention.

What is claimed is:

1. A temperature-measuring member comprising:
    a substrate having a thin metal film, the substrate having a smooth surface, the thin metal film being arranged on the substrate, the thin metal film having a smooth surface and a thermal expansion coefficient different from that of the substrate,
    wherein the substrate has a surface roughness Ra of 1 µm or less,
    the thin metal film has a surface roughness Ra of 0.5 µm or less, and
    the thin metal film has a thickness of 10 nm to 1,000 µm or less.

2. The temperature-measuring member according to claim 1, wherein the substrate is composed of a material selected from the group consisting of silicon, glass, quartz, graphite, SiC, sapphire, and resins.

3. The temperature-measuring member according to claim 1, wherein the thin metal film is composed of at least one material selected from the group consisting of Mg, Al, Si, Ti, Cr, Mn, Fe, Co, Ni, Cu, Zr, Mo, Ru, Pd, Ag, In, Sn, Hf, Ta, W, Pt, Au, and Zn.

4. The temperature-measuring member according to claim 1, further comprising:
    a protective film arranged on the thin metal film.

5. A temperature-measuring device configured to measure the maximum temperature of an object or atmosphere in a temperature profile, comprising:
    (1) a plurality of substrates each provided with a thin metal film, each of the substrates having a smooth surface, and each of the thin metal films having a smooth surface and a thermal expansion coefficient different from that of the substrates;
    (2) a surface-density-measuring unit configured to measure the surface density of the number of projections or depressions formed on the surface of each of the thin metal films, the thin metal films having been subjected to temperature profiles such that the plurality of substrates each provided with the thin metal film reach different maximum temperatures;
    (3) a storage unit configured to store data demonstrating the measured surface density of the number of projections or depressions obtained with the surface-density-measuring unit and demonstrating the relationship between the surface density of the number of projections or depressions and the measured maximum temperature; and
    (4) a temperature-calculating unit configured to determine the maximum temperature of the object or atmosphere having been subjected to a temperature profile on the basis of the relationship between the data stored in the storage unit and the surface density of the number of projections or depressions formed on the surface of the thin metal film of each of the substrates each provided with the thin metal film described in item (1) or substrates each provided with a thin metal film obtained under the same conditions as in item (1), the surface density being measured with the surface-density-measuring unit described in item (2), and the substrates being used as temperature-measuring members placed in an environment of the object or atmosphere subjected to any temperature profile.

6. The temperature-measuring device according to claim 5, wherein the surface-density-measuring unit described in item (2) includes
    a surface-information collector configured to observe surface shapes of the projections or depressions formed on the surface of each of the thin metal films with a microscope and to record the surface shapes as analog image signals,
    an AD converter configured to convert the image signals into a digitized form to provide image data sets, and
    a number-calculating section configured to count only projections or depressions having diameters within a predetermined range in the image data sets and to convert the resulting value into the number of projections or depressions per unit area.

7. The temperature-measuring device according to claim 6, wherein the predetermined range is 0.1 µm to 30 µm.

8. A method for measuring the maximum temperature of an object or atmosphere in a temperature profile, the method comprising:
    (1) preparing a plurality of substrates each provided with a thin metal film, each of the substrates having a smooth surface, and each of the thin metal films having a smooth surface and a thermal expansion coefficient different from that of the substrates;
    (2) subjecting the plurality of substrates each provided with the thin metal film to temperature profiles such that the plurality of substrates each provided with the thin metal film reach different maximum temperatures;
    (3) measuring the surface density of the number of projections or depressions formed on the surface of each of the thin metal films having been subjected to the temperature profiles;
    (4) determining the relationship between the surface density of the number of projections or depressions and the maximum temperature on the basis of measured surface densities of the number of projections or depressions and measured maximum temperatures;
    (5) placing the substrates each provided with the thin metal film described in step (1) or substrates each provided with a thin metal film obtained under the same conditions as in step (1) in an environment of the target object or atmosphere subjected to any temperature profile, the substrates serving as temperature-measuring members; and
    (6) measuring the surface density of the number of projections or depressions formed on the surface of the thin metal film of each of the substrates used as the temperature-measuring members, the substrates having been subjected to the temperature profile, and determining the maximum temperature of the target object or atmosphere having been subjected to the temperature profile on the basis of the measured surface density and the relationship between the surface density of the number of projections or depressions determined in step (4) and the maximum temperature.

9. The method according to claim 8, wherein each of the steps (3) and (6) of measuring the surface densities includes the substeps of observing surface shapes of the projections or depressions formed on the surface of each of the thin metal films with a microscope and recording the surface shapes as analog image signals, converting the image signals into a digitized form to provide image data sets, and counting only projections or depressions having diameters within a predetermined, range in the image data sets and converting the resulting value into the number of projections or depressions per unit area.

10. The method according to claim 9, wherein the predetermined range is 0.1 μm to 30 μm.

11. The method according to claim 8, wherein each of the steps (3) and (6) of measuring the surface densities includes the substeps of irradiating the projections or depressions formed on the surface of each of the thin metal films with light, detecting light scattered from the surface, and taking the scattered light as analog intensity signals, converting the intensity signals into a digitized form to obtain intensity data sets, and counting only projections or depressions providing the intensity data sets within a predetermined range and converting the resulting value into the number of projections or depressions per unit area.

12. The method according to claim 8, wherein each of the steps (3) and (6) of measuring the surface densities includes the substeps of irradiating the projections or depressions formed on the surface of each of the thin metal films with light, detecting light reflected from the surface, and taking the reflected light as analog intensity signals, converting the intensity signals into a digitized form to obtain intensity data sets, and counting only the intensity data sets within a predetermined range and converting the resulting value into the number of projections or depressions per unit area.

13. A temperature-measuring member comprising:

a substrate composed of one material selected from the group consisting of silicon, glass, quartz, graphite, sapphire, and ceramic materials; and a thin aluminum film provided on the substrate, the thin aluminum film having a thickness of 200 nm to 1,800 nm, wherein the thin aluminum film has a reflectivity of 80% or more with respect to incident light having a wavelength of 400 nm.

14. A temperature-measuring device comprising:

a holding unit configured to hold a temperature-measuring member;

a light-emitting unit configured to emit incident light having a wavelength of 250 nm to 850 nm toward the surface of a thin aluminum film of the temperature-measuring member;

a photoreceptor configured to receive reflected light from the surface of the thin aluminum film;

a reflectivity-computing unit configured to calculate the reflectivity of the surface of the thin aluminum film from the intensity of the incident light and the intensity of the reflected light; and a temperature conversion unit configured to convert the calculated reflectivity into a temperature and configured to estimate the maximum temperature of the temperature-measuring member having been subjected to a temperature profile.

15. A method for measuring a temperature, comprising:

preparing a temperature-measuring member including a substrate composed of one material selected from the group consisting of silicon, glass, quartz, graphite, sapphire, and ceramic materials; and a thin aluminum film formed on the substrate by sputtering or evaporation, the thin aluminum film having a thickness of 200 nm to 1,800 nm;

measuring a reduction in the reflectivity of the thin aluminum film due to projections formed on the surface of the thin aluminum film according to a temperature profile to which the temperature-measuring member has been subjected; and estimating the maximum temperature in the temperature profile on the basis of the reduction in reflectivity.

16. The method according to claim 15, wherein the reflectivity with respect to incident light having a wavelength of 250 nm to 850 nm is used.

* * * * *